United States Patent [19]
Hisatake

[11] Patent Number: 5,669,040
[45] Date of Patent: Sep. 16, 1997

[54] IMAGE FORMING APPARATUS CAPABLE OF ALTERING A JOB CONTENT AND JOB CONTENT ALTERING METHOD

[75] Inventor: Masayuki Hisatake, Ebina, Japan

[73] Assignee: Fuji Xerox Co., Ltd., Tokyo, Japan

[21] Appl. No.: 644,110

[22] Filed: May 10, 1996

[30]  Foreign Application Priority Data

May 11, 1995 [JP] Japan ..................... 7-113466

[51] Int. Cl.⁶ .................................................. G03G 15/00
[52] U.S. Cl. ................................ 399/83; 358/296; 399/82
[58] Field of Search ........................ 399/1, 2, 81, 82, 399/83, 85, 38, 75, 87, 130; 358/296, 300

[56]  References Cited

U.S. PATENT DOCUMENTS

| | | | |
|---|---|---|---|
| 5,045,880 | 9/1991 | Evanitsky et al. | 399/82 |
| 5,061,958 | 10/1991 | Bunker et al. | 399/81 |
| 5,229,814 | 7/1993 | Hube et al. | 399/81 X |
| 5,287,194 | 2/1994 | Lobiondo | 358/296 |
| 5,500,717 | 3/1996 | Altrieth, III | 399/83 |

FOREIGN PATENT DOCUMENTS

| | | |
|---|---|---|
| 63-231368 | 9/1988 | Japan . |
| 1-196959 | 8/1989 | Japan . |
| 2-81563 | 3/1990 | Japan . |
| 3-183259 | 8/1991 | Japan . |
| 5-63883 | 3/1993 | Japan . |

Primary Examiner—Sandra L. Brase
Attorney, Agent, or Firm—Oliff & Berridge

[57]  ABSTRACT

A job listing section displays four jobs of highest ranks in an output processing order among jobs currently stored. A window L1 indicates that a job shown therein is in a state of "printing" and windows L2–L4 indicate that jobs shown therein are in an output wait state. To check detailed settings of each job, an operator selects one of the jobs displayed on the job listing section by pressing the corresponding portion with a finger, whereby the selected job is reverse-displayed to inform the operator of the job selection. Detailed settings of the selected job are displayed on a job setting display section (pop-up window).

18 Claims, 25 Drawing Sheets

| ACCEPTANCE NO. | FUNCTION | JOB AMOUNT | OUTPUT PROCESSING ORDER | NUMBER OF INTERRUPTS |
|---|---|---|---|---|
| 1 | FAX | 5 | 1 | 0 |
| 2 | COPY | 30 | 2 | 0 |
| 3 | PRINT | 50 | 3 | 0 |
| 4 | PRINT | 1000 | 4 | 0 |

| ACCEPTANCE NO. | FUNCTION | JOB AMOUNT | OUTPUT PROCESSING ORDER | NUMBER OF INTERRUPTS |
|---|---|---|---|---|
| 1 | FAX | 5 | 1 | 0 |
| 2 | COPY | 30 | 3 * | 1 |
| 3 | PRINT | 50 | 4 * | 1 |
| 4 | PRINT | 1000 | 5 * | 1 |
| 5 | COPY | 10 | 2 | 0 |

FIG. 11

| JOB NO. | JOB MODE | PROCESSING CONDITIONS ||||| | ALREADY OUTPUT PROCESSING AMOUNT | STATE | PROCESSING PEAK |
|---|---|---|---|---|---|---|---|---|---|
| | | MAG. | SHEET | DOUBLE/ SINGLE SIDE | NUMBER OF PAGES | NUMBER OF COPIES | ----- | | | |
| 1 | COPY | 100 | A4 LAND. | SINGLE | 5 | 3 | ----- | 11 | PROCESSING | 1 |
| 2 | PRINT | 70 | A4 LAND. | SINGLE | 25 | 3 | ----- | 0 | WAITING | 5 |
| 3 | COPY | 100 | A3 | DOUBLE | 37 | 1 | ----- | 0 | WAITING | 4 |
| 4 | FAX-R | 100 | A4 PORT. | SINGLE | 16 | 1 | ----- | 0 | WAITING | 2 |
| 5 | COPY | 100 | A4 PORT. | DOUBLE | 8 | 1 | ----- | 0 | STOP | 0 |
| 6 | COPY | 100 | A4 LAND. | SINGLE | 10 | 2 | ----- | 0 | WAITING | 3 |
| 7 | FAX-S | 100 | A4 PORT. | SINGLE | 20 | 1 | ----- | 0 | PROCESSING | 1 |

FIG. 24A

| JOB NO. | MAG. | SHEET | PROCESSING CONDITIONS ||| ALREADY OUTPUT PROCESSING AMOUNT | STATE a | STATE b |
| --- | --- | --- | --- | --- | --- | --- | --- | --- |
| | | | DOUBLE/SINGLE SIDE | NUMBER OF PAGES | NUMBER OF COPIES | | | |
| 1 | 100 | A4 LAND. | SINGLE | 25 | 3 | --- | 42 | PROCESSING | HALFWAY |
| 2 | 70 | A4 PORT. | DOUBLE | 15 | 1 | --- | 10 | STOP | HALFWAY |
| 3 | 100 | A4 PORT. | SINGLE | 6 | 2 | --- | 10 | STOP | HALFWAY |
| 4 | 100 | A4 LAND. | DOUBLE | 10 | 2 | --- | 0 | WAITING | UNPROCESSED |
| 5 | 144 | A3 | SINGLE | 8 | 1 | --- | 0 | WAITING | UNPROCESSED |

FIG. 24B

| JOB NO. | MAG. | SHEET | PROCESSING CONDITIONS ||| ALREADY OUTPUT PROCESSING AMOUNT | STATE a | STATE b |
| --- | --- | --- | --- | --- | --- | --- | --- | --- |
| | | | DOUBLE/SINGLE SIDE | NUMBER OF PAGES | NUMBER OF COPIES | | | |
| 1 | 100 | A4 LAND. | SINGLE | 25 | 3 | --- | 47 | STOP | HALFWAY |
| 2 | 70 | A4 PORT. | DOUBLE | 15 | 1 | --- | 13 | PROCESSING | HALFWAY |
| 3 | 100 | A4 PORT. | SINGLE | 6 | 2 | --- | 10 | STOP | HALFWAY |
| 4 | 100 | A4 LAND. | DOUBLE | 10 | 2 | --- | 0 | WAITING | UNPROCESSED |
| 5 | 144 | A3 | SINGLE | 8 | 1 | --- | 0 | WAITING | UNPROCESSED |

FIG. 24C

| JOB NO. | MAG. | SHEET | PROCESSING CONDITIONS ||| ALREADY OUTPUT PROCESSING AMOUNT | STATE a | STATE b |
| --- | --- | --- | --- | --- | --- | --- | --- | --- |
| | | | DOUBLE/SINGLE SIDE | NUMBER OF PAGES | NUMBER OF COPIES | | | |
| 1 | 100 | A4 LAND. | SINGLE | 25 | 3 | --- | 47 | STOP | HALFWAY |
| 3 | 100 | A4 PORT. | SINGLE | 6 | 2 | --- | 11 | PROCESSING | HALFWAY |
| 4 | 100 | A4 LAND. | DOUBLE | 10 | 2 | --- | 0 | WAITING | UNPROCESSED |
| 5 | 144 | A3 | SINGLE | 8 | 1 | --- | 0 | WAITING | UNPROCESSED |

IMAGE FORMING APPARATUS CAPABLE OF ALTERING A JOB CONTENT AND JOB CONTENT ALTERING METHOD

BACKGROUND OF THE INVENTION

1. Field of the Invention

This invention relates to an image forming apparatus which enables the operator to select any one from jobs and reliably and easily change the processing content of the selected job.

2. Description of the Related Art

In recent years, a composite machine which provides a copy function, a print function, a facsimile function, etc., has been becoming pervasive. In such a composite machine, for example, an image output unit is shared between the copy and print functions and an image input unit is shared between the facsimile transmission and copy functions. Therefore, the composite apparatus has large merits in space saving, cost reduction, etc., as compared with installation of separate single units for each function.

For example, a digital copier as disclosed in Japanese Patent Laid-Open No. Hei. 2-81563 contains storage means for storing a plurality of jobs and input and output sections are operated independently, whereby the jobs can be processed in parallel. According to the copier, for the first copy, image data read through image read means is stored in the storage means and printed out on an output unit and for the second and later copies, it is read from the storage means and printed out, so that while the second or later copy is being output, an original document of the next job can be read through the image read means. Thus, a plurality of jobs in operation exist in the storage means.

In this case, jobs related to the copy function, the print function, and the facsimile function may be mixed in the jobs in operation.

By the way, in such a composite machine capable of processing jobs in parallel, the user might want to alter the once registered job content or cancel the job itself. For example, he might want to increase or decrease the number of copies or prints at the job registration time.

At this time, it is important that when alteration to the processing content of a job is requested, the job be identified and its processing content of be altered rapidly. However, since known operation means used for specifying such a alteration are directed to the behavior of the entire apparatus, if it is applied to the composite machine capable of processing jobs in parallel, other jobs being executed will be affected.

Then, an image processing system provided with input and output display sections apart from a job setting section for enabling the operator to make various specifications for input and output separately is disclosed in Japanese Patent Laid-Open No. Hei. 1-196959. According to the image processing system, the processing contents on input and output can be changed separately.

Also, an image processing system having an input section and an output section each provided with stop specification means for enabling the user to give a stop instruction separately is disclosed in Japanese Patent Laid-Open No. Hei. 3-183259. Further, a composite machine provided with stop keys for each composite mode for enabling the operator to clear/stop for each mode is disclosed in Japanese Patent Laid-Open No. Sho. 63-231368.

By the way, the techniques described in Japanese Patent Laid-Open Nos. Hei. 1-196959 and Hei. 3-183259 focus attention on the shared portions of the image processing systems in which a plurality of functions can be executed, and enable processing change in the shared portions. However, if which shared portion the job to be altered is processed in is not known, altering operation cannot be performed.

In the technique disclosed in Japanese Patent Laid-Open No. Sho. 63-231368, a job is identified in function units and an improvement in operation is made. However, all jobs operating in the specified function are interrupted and a specific job desired by the user cannot be interrupted.

On the other hand, a technique capable of stopping any of functions in concurrent processing in a facsimile machine having a composite function is described in Japanese Patent Laid-Open No. Hei. 5-63883. However, also in the technique, a stop instruction is given in function units, and if the technique is applied to a system that can process jobs concurrently in a single function, all jobs in the function will stop.

Further, the techniques shown in gazettes enable the operator only to give stop and interrupt instructions and therefore cannot be applied when the job content is altered; they lack general versatility.

SUMMARY OF THE INVENTION

It is therefore an object of the present invention to provide an image forming apparatus which enables an operator to reliably and easily identify an already registered job and alter its processing content without delaying processing of the other jobs.

To attain the above object, according to the invention, there is provided an image forming apparatus for processing jobs requiring image formation, comprising:

means for inputting job information based on which each of the jobs can be identified;

means for determining an execution order of the jobs corresponding to the job information input through said job information inputting means;

means for storing the job information input through said job information inputting means;

means for displaying the job information stored in said job information storing means so that the job information is correlated with the execution order determined by said execution order determining means;

means for executing the jobs in the execution order determined by said execution order determination means while referencing the job information stored in said job information storing means; and means for designating a particular job from among the job information displayed by said display means, thereby allowing alteration of a processing content of the designated job.

According to a second aspect of the invention, there is provided an image forming apparatus for processing jobs requiring image formation, comprising:

means for inputting job information based on which each of the jobs can be identified, the job information including information indicating processing functions of the respective jobs;

means for storing the job information input through said job information inputting means;

means for displaying the job information stored in said job information storing means such that the job information is classified in accordance with the processing functions indicated by the job information;

means for executing the jobs while referencing the job information stored in said job information storing means; and means for designating a particular job from the job information displayed by said display means, thereby allowing alteration of a processing content of the designated job.

According to a third aspect of the invention, there is provided an image forming apparatus comprising:

scanner means for inputting document information;

process information storing means for storing process information including at least one of information of the number of document sheets and information of the number of copies corresponding to the document information input by said scanner means;

document information storing means for storing the document information input by said scanner means while referencing the process information stored in said process information storing means;

display means for reading the process information corresponding to the document information stored in said document information storing means from said process information storing means, and for displaying at least one of the information of the number of document sheets and the information of the number of copies so that it is correlated with a print output execution order;

means for selecting a particular process from the process information displayed by said display means, thereby allowing alteration of a processing content of the selected process; and means for altering the processing content of the selected process.

According to a fourth aspect of the invention, there is provided an image forming apparatus capable of parallel processing of jobs requiring image formation, comprising:

means for recognizing, upon input of each of the jobs, job information based on which each of the jobs can be identified;

means for detecting a job processing state in said image forming apparatus;

processing state correspondence display means for displaying the job information recognized by said job information recognizing means such that the job information is classified in accordance with the processing states detected by said processing state detecting means; and means for designating a particular job from the job information displayed by said processing state correspondence display means, thereby allowing alteration of a processing content of the designated job.

According to a fifth aspect of the invention, there is provided an image forming apparatus comprising:

an image data memory for storing image data of jobs requiring image formation;

a function identifier memory for storing function identifiers corresponding to the respective image data stored in said image data memory and indicating processing functions of the respective jobs;

a display for displaying the jobs such that the jobs are classified in accordance with the function identifiers stored in said function identifier memory; and a switch for selecting a particular job from among the jobs displayed on said display.

According to a sixth aspect of the invention, there is provided an image forming apparatus comprising:

means for inputting image data of jobs requiring image formation;

recording means for printing the image data input through said image data input means on recording sheets, said recording means being capable of printing, in parallel, image data corresponding to a plurality of jobs input through said image data input means;

job identifier display means for recognizing and displaying job identifiers for identifying the jobs to be processed in parallel by said recording means; and means for designating a particular job from the job identifiers displayed by said job identifier display means, thereby allowing alteration of a processing content of the designated job.

According to a seventh aspect of the invention, there is provided a job content altering method, comprising the steps of:

inputting job information based on which each of jobs requiring image formation can be identified;

determining an execution order of the jobs corresponding to the input job information;

means for storing the job information input through said job information inputting means;

displaying the job information in accordance with the determined execution order;

executing image formation of the jobs in the determined execution order; and making an instruction as to whether image formation of a job being executed is to be stopped or continued.

BRIEF DESCRIPTION OF THE DRAWING

FIGS. 4A and 4B show job management tables used to change the processing order in the first embodiment;

FIG. 11 is an illustration to show an example of a job management table for management of changing the processing order among jobs, selecting an arbitrary job and altering the processing setup contents of the job, etc.;

FIGS. 24A–24C show examples of job management tables in the third embodiment;

DESCRIPTION OF THE PREFERRED EMBODIMENTS

First Embodiment

A-1. Configuration of First Embodiment a. System Configuration

A first embodiment of the invention will be discussed with reference to the accompanying drawings.

Figure 1:
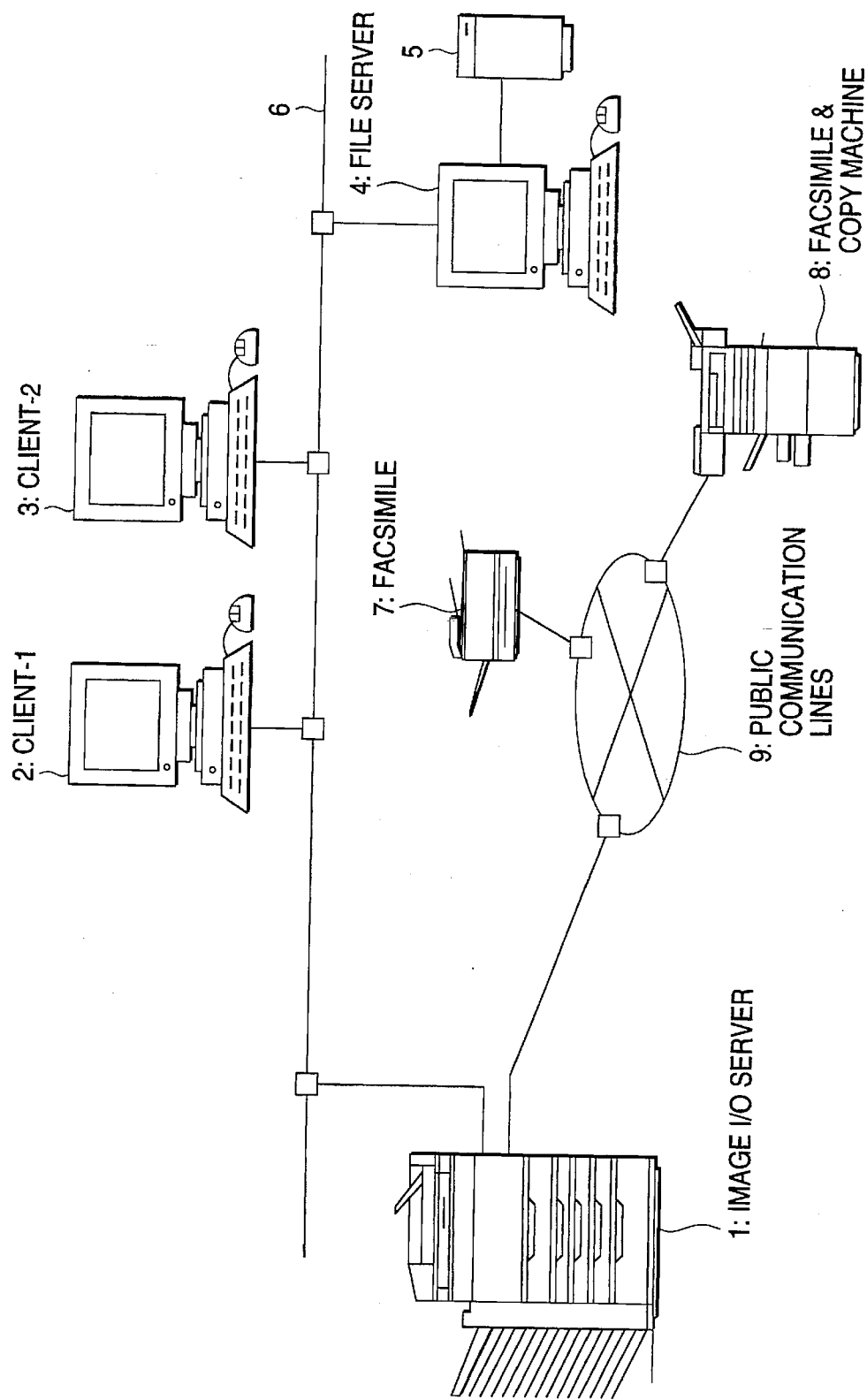
FIG. 1 is a schematic drawing to show the system configuration of the first embodiment of the invention.

FIG. 1 is a schematic drawing to show the system configuration of the first embodiment. In the figure, numeral 1 is an image forming apparatus which has a composite function and can transfer data to and from another composite machine 8 and facsimile machine 7 via public communication lines 9. Numeral 6 is a local area network to which terminals (workstation or personal computer) 2 and 3, a file server 4, and the composite machine 1 are connected. A filing unit 5 is connected to the file server 4 for storing various kinds of data.

In the system configuration, the composite machine 1 has a copy function job, a print function job, a scan and filing function job, FAX transmission/reception function job, etc., for example, as input/output processing functions. The copy function job is a process for reading an original document through a scanner of the composite machine 1 and printing it on a recording sheet by an image formation section of the composite machine 1. The print function job is a process for printing code data sent from the terminal 2 or 3 on a recording sheet by the image formation section of the composite machine 1. The scan and filing function job is a process for reading an original document through the scanner of the composite machine 1 and sending it via the local area network 6 and the file server 4 to the filing unit 5, etc.

In the description that follows, for simplicity, the scanner and filing function job will not be discussed.

Next, the FAX transmission/reception function job is a process for sending image data to the facsimile machine 7 or the composite machine 8 via the public communication lines 9 or receiving image data from the facsimile machine 7 or the composite machine 8 via the public communication lines 9 and printing it on a recording sheet by the image formation section of the composite machine 1.

Various requests given to the composite machine 1 can be entered through a user interface thereof; they can also be entered via the local area network 6 from the terminals 2 and 3. Therefore, a number of requests may be issued to the composite machine 1 in parallel. Thus, a control section 12 of the composite machine 1 (see FIG. 2) can accept a number of jobs. To enhance productivity, further it can process them in parallel and independently unless contention occurs between different jobs in the same process. (This will be described later in detail.)

b. Configuration of Composite Machine 1

Figure 2:
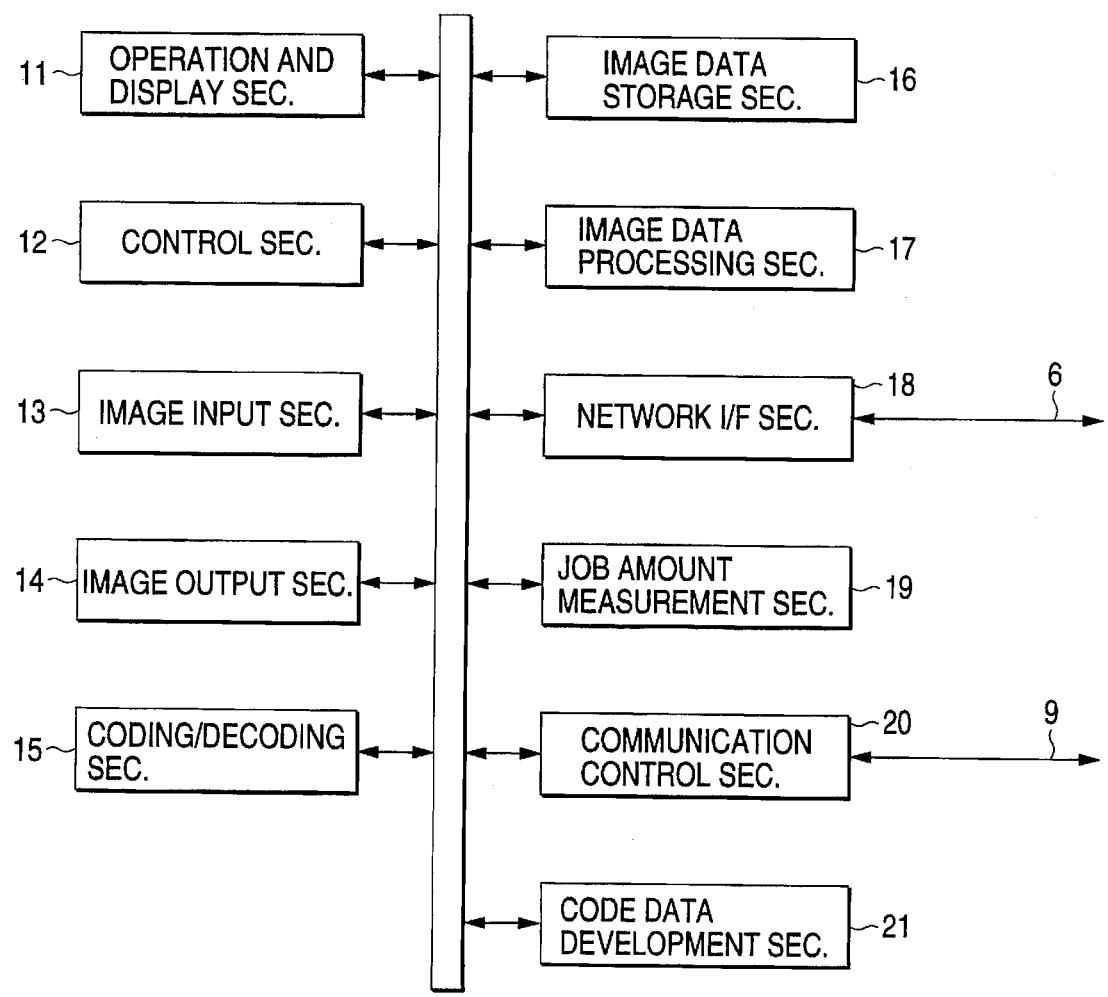
FIG. 2 is a block diagram to show the configuration of the first embodiment.

FIG. 2 is a block diagram to show the configuration of the composite machine 1. An operation and display section 11 shown in the figure comprises keys, a display, a control panel, etc. The section 11 allows an operator to enter process instructions related to the functions, such as copy function setting of the number of copies, copy magnification, etc., and facsimile function setting of the transmission destination, transmission mode, etc., and displays an error message, operation guide, etc. (See FIGS. 6–8.)

An image input section 13 is a block for applying light to an original document placed on a platen with a fluorescent lamp, etc., optically reading the reflected light by a CCD sensor, and performing offset adjustment and gain adjustment of the read signal, then converting analog image data into digital image data. The image input section 13 may perform so-called shading correction, etc., for correcting sensitivity variations in the elements of the CCD sensor. If it automatically detects the original document size, information indicating the original document size (job information, a part of function identifier) is output.

An image output section 14 is a printer block using a laser or LEDs for selectively exposing a photoreceptor drum with a laser beam, a LED head, or the like., for forming a latent image, transferring an image developed from the latent image by a developer consisting of toner and carrier to a recording sheet, and fusing it.

A coding/decoding section 15 is a block for compressing image data to a predetermined coding format (MH, MR, or MMR) when the image data is transmitted by fax and decoding facsimile information received via the public communication lines 9 into its original image data.

A code data development section 21 is a block for expanding print data received via the local area network 6 to bit map image data. The print data is described as code in a page description language.

If the terminals 2 and 3 are connected to a single network as in FIG. 1 and share the composite machine 1 according to the embodiment as a print terminal, the print data prepared in the terminals 2 and 3 may be described in different page description languages. For example, languages such as PostScript of Adobe Systems, Inc., ESC/P of Seiko Epson Corporation, and Interpress of Xerox Corporation are available as the page description language types. The character size and type of print data are specified and graphics drawing, etc., can be performed in the languages. Since each page description language has proper code, the code data development section 21 detects proper code from among received code data, determines which page description language the code data is described in, and expands the code data to bit map image data according to the determination result.

A network interface section 18 is a block for performing communication control with the terminals 2 and 3 (workstation, personal computer, etc.,) via the local area network 6 and receiving print data.

A communication control section 20 is a block for modulating coded data generated by the coding/decoding section 15 and transmitting the data to the facsimile machine 7 or the composite machine 8 via the public communication lines 9 or demodulating a signal received from other facsimile machines, etc., for conversion to digital coded data and further controlling line connection.

An image data storage section 16 is a block for temporarily storing digital image data read through the image input section 13, print data received on the network interface section 18, or facsimile data received at the communication control section 20. It is also used as a working memory when the code data development section 21 expands code data to bit map image data or when the coding/decoding section 15 compresses image data to coded data or decompresses coded data to image data. Further, data received at the network interface section 18 or the communication control section 20 and data read through the image input section 13 may also be stored in the image data storage section 16 as file data. The embodiment uses the image data storage section 16 as a memory for temporarily storing the image data, but memories may be placed in a one-to-one correspondence with the blocks.

Next, an image data processing section 17 is a block for performing image processing, such as rotation processing for setting orientation of image data to that of a recording sheet (recording sheet available with the image output section 14) and smoothing processing for removing zigzags occurring in fine line portions of a bit map image generated by the code data development section 21, and when image data read through the image input section 13 is transmitted by fax, for changing the resolution of the read image data so as to match the resolution of the associated facsimile recording section.

A job amount measurement section 19 is a block for measuring the job amount of the image output section 14 shared among the functions of the embodiment, namely, the facsimile function, the print function, and the copy function. The description to follow assumes that the job amount refers to the actual number of recording sheets onto which the image output section 14 outputs image data. For example, if 10 sheets of an A4-size original document are read through the image input section 13 and five copies of them are made, the job amount is 50. However, in the invention, the definition of the job amount is not limited to it; for example, the job amount may be represented by the processing time in the image output section 14 or the total amount of image data output on the image output section 14. Also, it may be related to the processing amount in the image input section 13 or image data storage section 16 in addition to that in the image output section 14.

Next, a control section 12 controls the operation mode, operation timing, etc., of each block in response to the functions. That is, as described below, the control section 12 determines the processing order of the jobs in response to the job amount measured by the job amount measurement section 19 and controls the operation timing of the blocks so that the function jobs are output from the image output section in accordance with the determined order. It has a CPU, program ROM, RAM, etc. It may also include floppy disk or hard disk for storing data.

c. Conjoint Operations of Blocks

Next, conjoint operations of the blocks in the functions will be discussed with reference to FIG. 2.

(1) Conjoint Operations in Copy Function

Image data is read through the image input section 13 and is temporarily stored in the image data storage section 16. At this time, for data amount reduction, the image data may be once compressed to coded data through the coding/decoding section 15 for storage. In parallel with this operation, the coded data temporarily stored in the image data storage section 16 is read in sequence according to conditions set on the operation and display section 11 and decompressed to image data by the coding/decoding section 15, and the image data is output on the image output section 14. At this time, if the orientation of the image data read through the image input section 13 does not match that of a recording sheet selected on the operation and display section 11 or the recording sheet tray for accommodating recording sheets in the desired orientation is empty, the image data decompressed by the coding/decoding section 15 is sent to the image data processing section 17 and undergoes rotation processing, then is output on the image output section 14.

(2) Conjoint Operations in Facsimile Function

To transmit image data to another facsimile machine, etc., first a transmission original document is read through the image input section 13 and compressed to coded data by the coding/decoding section 15 and the coded data is once stored in the image data storage section 16. The operator enters the telephone number of the destination and specifies the transmission mode on the operation and display section 11. Next, the communication control section 20 makes connection to the public communication lines 9, calls the associated station, and establishes a call. When information of the destination facsimile class, etc., is obtained from the communication control section 20, transmission data is read from the image data storage section 16 and the image data processing section 17 performs conversion processing so that the resolution matches that of the associated facsimile recording section as required. Then, the coding/decoding section 15 codes the image data in the coding system responsive to the transmission mode and sends the resultant data to the communication control section 20. The digital coded data is thus modulated for transmission to the associated facsimile machine. Upon completion of the transmission, the communication control section 20 terminates the connection to the public communication lines 9.

On the other hand, if image data is received from the facsimile machine 7, the communication control section 20 receives modulated coded data over the public communication lines 23 and demodulates the data for conversion to digital coded data, then temporarily stores the digital coded data in the image data storage section 16. The coding/decoding section 15 decompresses the coded data stored in the image data storage section 16 to image data, which is then output on the image output section 14. At this time, the image data processing section 17 converts the resolution of the received image data into that of the image output section 14 as required. As discussed in item (1) above, if there is no recording sheet suitable for the orientation of the received image data, the image data processing section 17 performs rotation processing for the data, then the resultant data is output on the image output section 14.

(3) Conjoint Operations in Print Function

Print data transmitted via the local area network 6 is received on the network interface section 18. The code data development section 21 converts the print data described in code into bit map image data. The coding/decoding section 15 compresses the bit map image data to coded data, which is temporarily stored in the image data storage section 16. The data is read from the image data storage section 16 in response to a print control instruction sent together with the code data. The coding/decoding section 15 decompresses the data to image data, which is then output on the image output section 14. The image data processing section 17 may perform edge smoothing processing for the bit map image data as required.

d. Configuration of Job Amount Measurement Section 19

Figure 3:
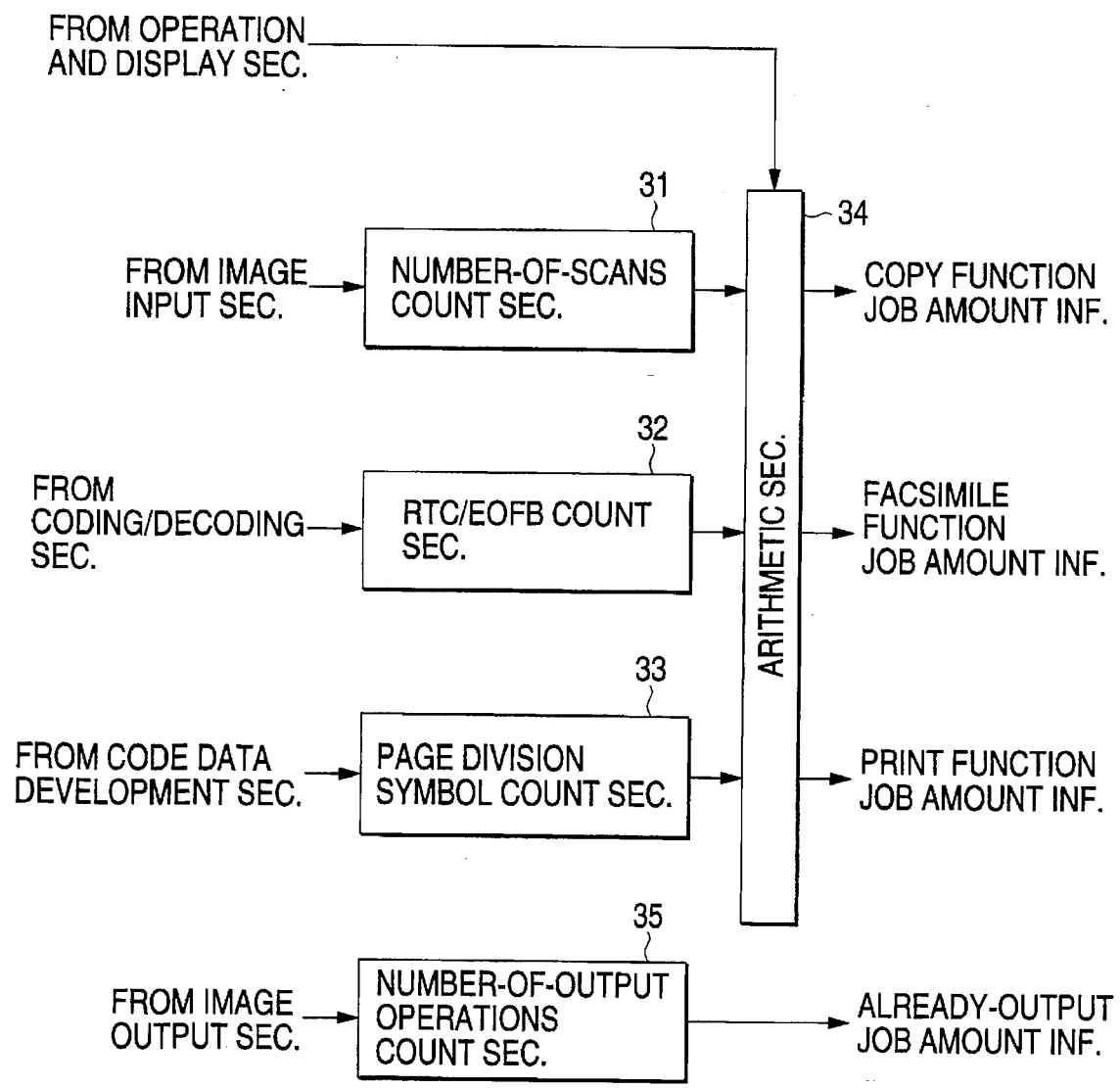
FIG. 3 is a block diagram to show the configuration of a job amount measurement section in the first embodiment.

FIG. 3 is a block diagram to show the configuration of the job amount measurement section 19. As shown here, the job amount measurement section 19 consists of a number-of-scans count section 31, an RTC/EOFB code count section 32, a page division symbol count section 33, an arithmetic section 34, and a number-of-output-operations count section 35.

The job amount in the embodiment is defined as the actual number of recording sheets onto which the image output section outputs image data, as described above. However, in the embodiment, the operation is also performed in an N UP COPY mode for outputting more than one reduced original document sheet to one recording sheet, a DOUBLE-SIDED COPY mode for recording image data on double sides of a recording sheet, etc., thus 1-page image data is not always output onto a recording sheet. Then, considering this point, the job amount is defined as Equation (1):

$$\text{(Job amount)} = \text{(number of original document sheets)} \times \frac{\text{(number of output copies)}}{\text{(number of original document sheets per recording sheet)}} \quad (1)$$

Information items of the number of output copies and the number of original document sheets per recording sheet required for performing a computation of Equation (1) can be known from output information sent together with print data (information containing specification of the number of print sheets) in the print function. In other functions, they can be known from output information set on the operation and display section 11 (information containing setup values such as the number of output sheets).

In contrast, how to find the information item of the number of original document sheets in Equation (1) varies depending on the function. First, the information item of the number of original document sheets related to the copy function is found by the number-of-scans count section 31 which counts the number of times the scanner has operated to read the original document through the image input section 13. However, here a prerequisite is as follows: When one original document is set, even if more than one copy of the original document is made, the scanner scans each sheet of the original document only once and the read image data is stored in the image data storage section 16, then for the second or later copy, the data stored in the image data storage section 16 is read and the image output section 14 performs output processing. If the number of original document sheets is previously known, it may be keyed in through the operation and display section 11. The number-of-scans count section 31 is initialized for each copy function job.

Next, the information item of the number of original document sheets related to the facsimile function can be found as follows: The coding/decoding section 15 detects RTC codes (return control codes used with G3 machines) or EOFB codes (end of facsimile block codes used with G4 machines) each indicating the end of a page from among digital coded data to which facsimile data received at the communication control section 20 is demodulated, and the RTC/EOFB code count section 32 counts the codes. The RTC/EOFB code count section 32 is initialized for each facsimile function (printout) job.

Next, the information item of the number of original document sheets related to the print function can be found as follows: The code data development section 21 detects predetermined page division symbols from among print data received on the network interface section 18 (data described in code in a PDL such as PostScript) and the page division symbol count section 33 counts the symbols. However, the page division symbol is not always inserted in the print data. In such a case, the code data development section 21 expands code data to bit map image data and when the number of lines per recording sheet is reached, one page is recognized. In this case, the page division symbol count section 33 is initialized for each print function job.

The number of original document sheets for each function thus found is substituted into Equation (1) together with the above-mentioned (number of original document sheets per recording sheet) and (number of output copies), and the Equation is computed by the arithmetic section 34. The result is converted into job amount information for each function.

Next, already-output job amount information is defined as the sum of the number of recording sheets discharged to the outside for which print processing is complete and the number of recording sheets for which print processing is being performed for the current output processing job in the image output section 14. It can be found by the number-of-output-operations count section 35 which counts the number of recording sheets. The number-of-output-operations count section 35 is initialized each time an output processing job in the image output section is changed.

A-2. Operation of First Embodiment a. Outline of Job Processing Order Control

Next, control of the job processing order will be discussed.

First, the control section prepares a job management table JT as shown in FIGS. 4A and 4B in accordance with the job amount for each function found by the job amount measurement section 19. In this case, the job management table JT is set in a memory located in the control section 12. It may be set on a floppy disk, a hard disk, or the like in the control section 12 as required.

Next, the acceptance number shown in FIGS. 4A and 4B denotes the order of issuing an output processing request to the image output section 14. Output processing requests are made after the job amounts are determined by computation of Equation (1). In the example in FIG. 4A, a facsimile function job with job amount 5 first requests output processing, then a copy function job with job amount 30, a print function job with job amount 50, and a print function job with job amount 1000 issue output processing requests in order. In the embodiment, the control section 12 determines the execution order so as to assign higher priority levels to jobs with smaller job amounts. In the example in FIG. 4A, since the output processing request order is just the ascending order of job amounts, the image output section 14 performs output processing in the order as it is.

Assume that a copy function job with job amount 10 then requests output processing as the fifth output processing request, as shown in FIG. 4B. Since the job amount of the job is smaller than the job amount 30 of the second copy function job, the control section 12 lowers the output processing ranks of the respective jobs with acceptance numbers 2-4 by one rank, and sets the output processing rank of the job with acceptance number 5 to the second place. At this time, the number of interrupts made by other jobs is updated for each job. For example, in FIG. 4B, the jobs with acceptance numbers 2–4 are interrupted and the number of interrupts of each of the jobs is set to 1. The number of interrupts is managed to prevent output processing of a job with a larger job amount from being interrupted so long as another job with a smaller job amount than that of the job requests output processing. That is, the output processing order of the job whose number of interrupts reaches a predetermined value (value preset in the system or set by the user through the operation and display section 11) is not changed although another job with a smaller job amount occurs subsequently.

b. Details of Job Processing Order Control Operation

Figure 5:
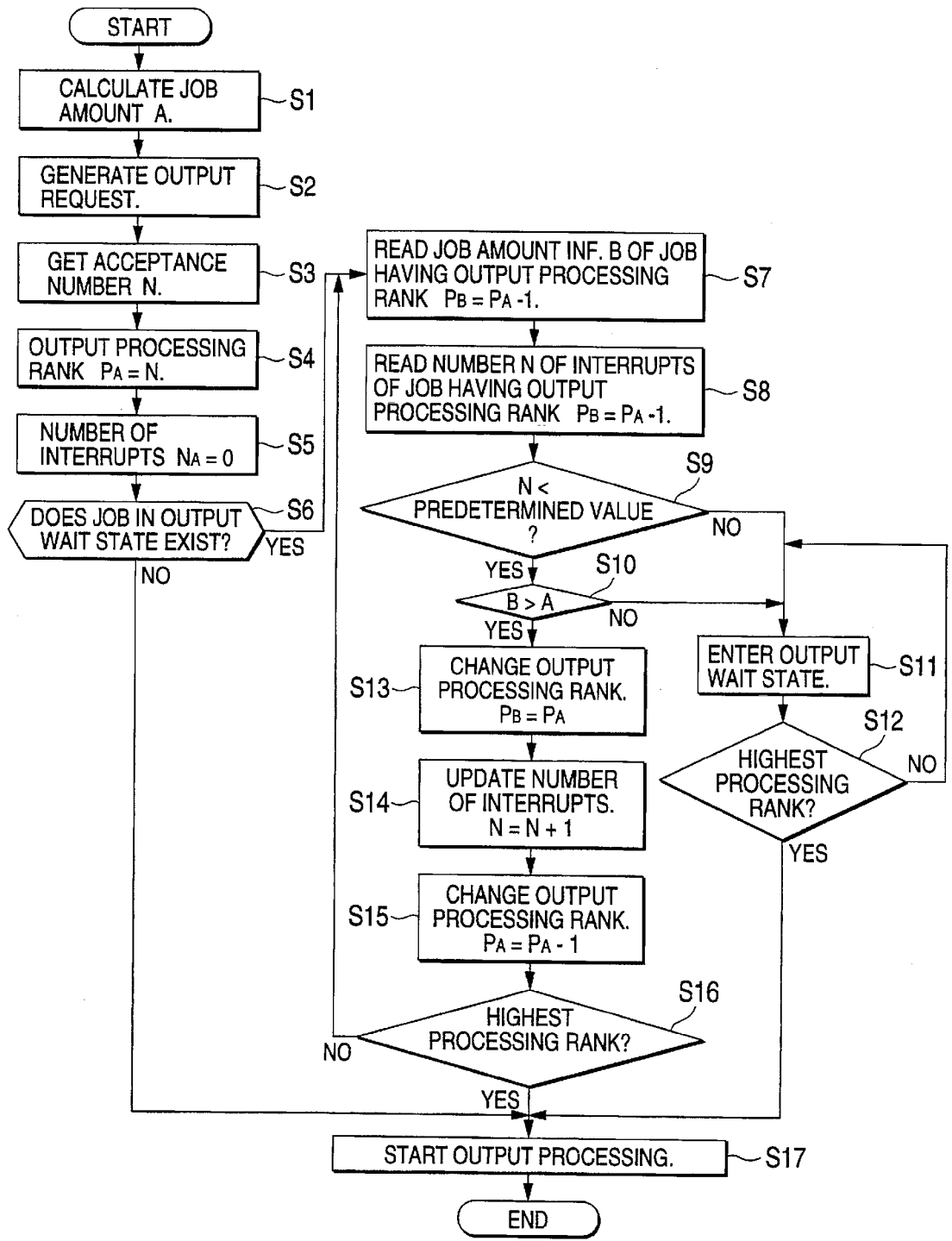
FIG. 5 is a flowchart to explain the job processing order change operation of a control section in the first embodiment.

FIG. 5 is a flowchart to explain the job processing order change operation of the control section 12. When a job of any function involving output processing of the image output section 13 occurs, the job amount measurement section 19 calculates the job amount of the job in accordance with the function (see Equation (1)) as job amount A at step S1. After the job amount is determined, an output request is generated at step S2, and the acceptance number N of the function job is gotten at step S3. Next, output processing rank of order PA when the output request is generated is set equally to the acceptance number N at step S4, and the number of interrupts of the job, NA, is set to 0 at step S5.

The job management table JT shown in FIGS. 4A and 4B is referenced for determining whether or not a job in an output wait state exists at step S6. If a job in an output wait state does not exist, output processing is started at step S17.

On the other hand, if a job in an output wait state already exists (determination at step S6=YES), the job amount information B and the number of interrupts N of the job assigned the lowest output processing rank of order at this point in time, namely, output processing rank PB=PA−1 are read from the job management table JT at steps S7 and S8. The readout number N of interrupts is compared with a predetermined value at step S9. Here, if N reaches the predetermined value, a new job cannot take precedence over the job with the output wait order PB, thus the job with the acceptance number N enters an output wait state at step S11. The job entering the output wait state is made to wait until output processing of other jobs assigned the higher processing ranks of order is complete at step S12. After processing of other jobs is complete, output processing of the job in the output wait state is started at step S17.

On the other hand, if N is less than the predetermined value, control advances from step S9 to step S10 at which the job amount information A is compared with the job amount information B. If the job amount information A is equal to or greater than the job amount information B, the output processing rank PA is determined and the job enters an output wait state at step S11.

If the job amount information A is judged to be less than the job amount information B at step S10, the output rank is changed as follows: The job assigned the current output processing rank PB (assume that it is job B) is changed to output processing rank PA, whereby the processing rank of job B is degraded by one level at step S13 and the number of interrupts N of job B is incremented by one at step S14 because one interrupt occurs for job B. The processing rank of the job assigned the former output processing rank PA (new job) is promoted by one level at step S15. If the output processing order is changed, whether or not the new job has the highest processing rank is determined at step S16. If it does not have the top processing rank, control returns to step S7 and the above-described operation is again performed. That is, whether or not the output processing rank is to be changed is determined, and if the processing rank needs to be changed, it is changed. Such an operation is repeated and when the output processing rank of the new job becomes the top, output processing of the job is started at step S17.

Not only jobs in an output wait state, but also the current job in output processing can be included in the jobs on which the judgment as to whether the output processing rank is to be changed is performed. The job whose processing rank has newly become highest may be processed in the form of interrupt processing for the job being processed.

c. Alteration of Job Content

By the way, to alter the processing content in such a manner that a desired job is selected from among jobs waiting for processing and that the number of copies or the number of print copies at the registration time of the job is increased or decreased or processing of the job itself is canceled, it is desired that the desired job can be specified before processing of the job is started. A sequence of steps such as job identification and alteration of a job processing content is executed through the operation and display section 11.

Figure 6:
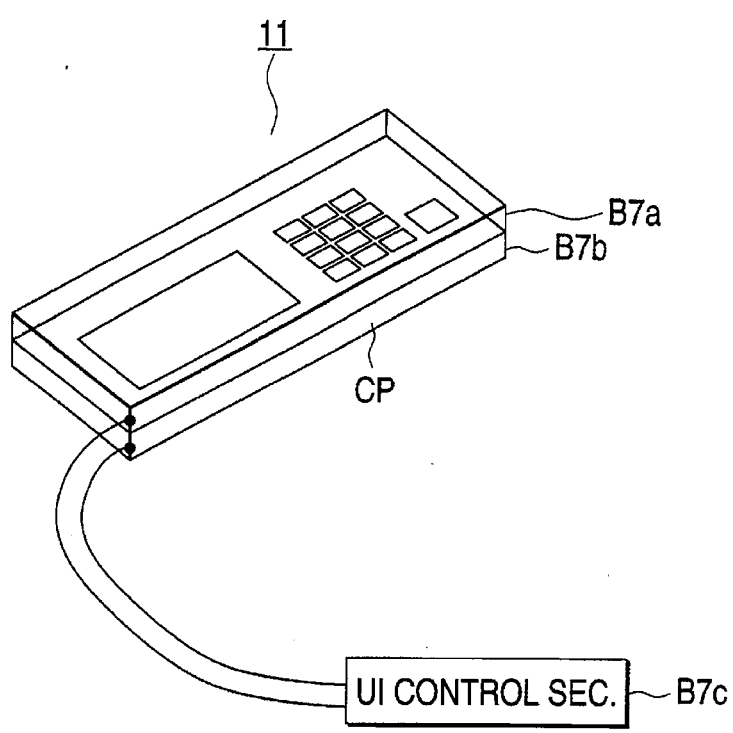
FIG. 6 is a schematic drawing of an operation and display section in the first embodiment.

FIG. 6 is a schematic drawing of the operation and display section 11 in FIG. 2. In FIG. 6, the operation and display section 11 has a control panel section CP of an integral structure of a transparent touch panel B7a and a display B7b formed facing the transparent touch panel. In this case, the transparent touch panel B7a serves as an input section and the display B7b serves as a display section. The operation and display section 11 also has a UI control section B7c for controlling display and input of the control panel section CP.

The transparent touch panel B7a uses any of detection systems such as an optical system, a transparent conductive film (resistance film) system, electrostatic capacity system, or a pressure sensor system, and sends pressure of an operator finger, etc., as a key input signal to the UI control section B7c.

The display B7b is made of a liquid crystal display (LCD), a plasma display (PDP), a light-emitting diode display (LED), an electrostatic recording projection display (ECD), a CRT display, or the like.

Figure 7:
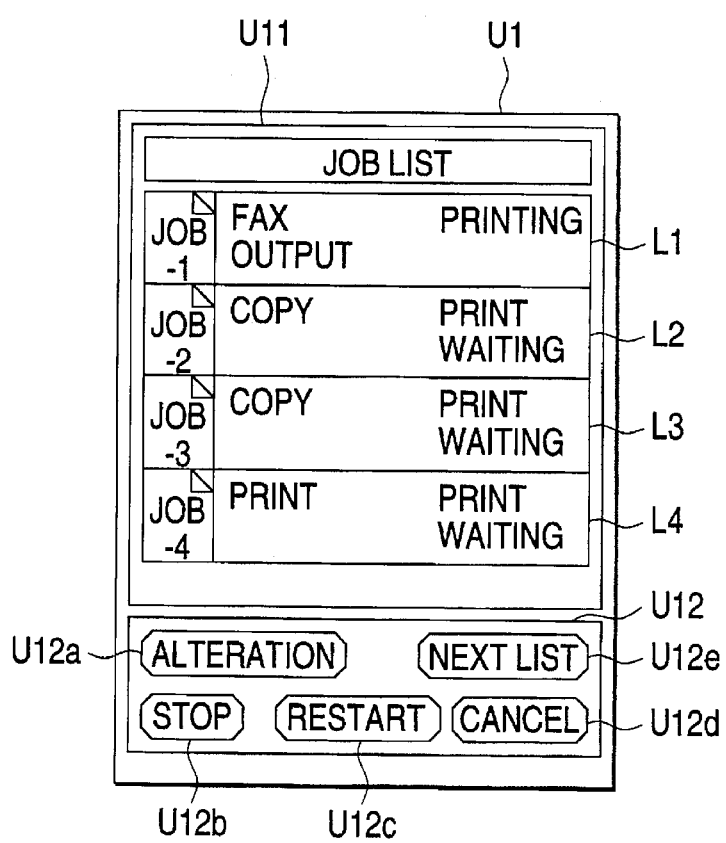
FIG. 7 is an illustration to show a job console section of a control panel section CP in the first embodiment.

FIG. 7 is a front view to show a job console section U1 of the control panel section CP in the embodiment. This job console section U1 consists of a job listing section U11 and a job operation section U12. The job listing section U11 displays four jobs in the output processing order among the current jobs stored. The jobs correspond to those shown in FIG. 4B. A display processing flow of the job listing section 11 will be discussed later.

Job-1 displayed on window L1 in FIG. 7 is a "print processing of an image received by fax" job and is "printing." Job-2 displayed on window L2 and job-3 displayed on window L3 are copy jobs in an output wait state. Job-4 displayed on window L4 is a print job in an output wait state like the job displayed on window L2.

Figure 8:
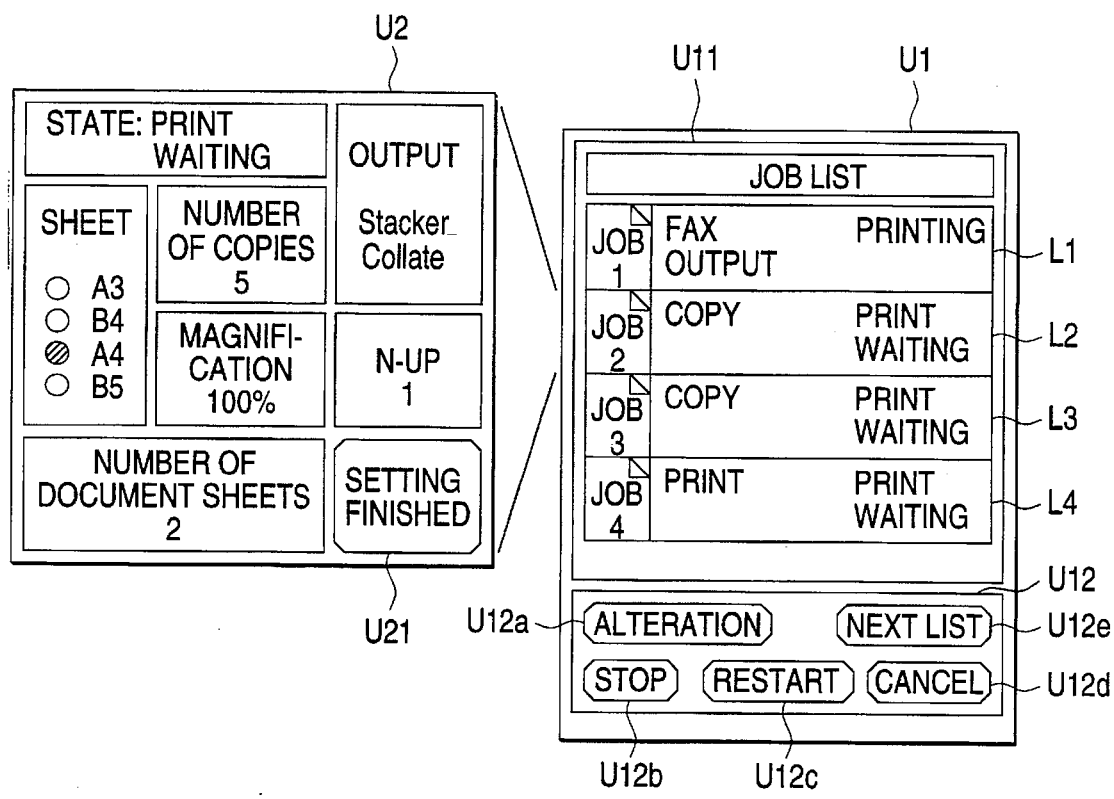
FIG. 8 is an illustration to show the job console section and a job setting and display section in the first embodiment.

Next, to check detailed setting of each job, as shown in FIG. 8, the operator selects one of the jobs in the job list displayed on the job listing section U11 by pressing the corresponding part with a finger. Then, the selected job is reverse-displayed, informing the operator that the job is selected, and the detailed setup contents of the job are displayed on a job setting and display section U2 (pop-up window). In this example, job-2 displayed on window L2 is a job for copying "five times two sheets of an original document to an A4-size recording sheet in 100% equal magnification." If a desired job is not displayed on the job listing section U11, the operator selects a NEXT LIST key U12e, whereby four jobs assigned the next highest output processing ranks among the remaining jobs are displayed.

To alter the job processing content, the operator selects and reverse-displays a desired job as described above, then selects a ALTERATION key U12a, then makes necessary alterations for the job on the job setting and display section U2 and after the termination of the altering operation, selects a SETTING FINISHED key U21, whereby the alteration of the setup contents of the job is completed. At this time, the setup contents of any jobs containing the job being processed (in FIGS. 7 and 8, Job 1 displayed on window L1) can be changed. In this case, the operator presses the parts in the job setting and display section U2 for changing the magnification, paper size, etc., according to the change contents. To simplify control, the setup contents of the job being processed may be inhibited from being altered.

To temporarily stop processing of a desired job, cancel the job itself, or restart processing of the temporarily stopped job, the operator selects the desired job out of the job list on the job listing section U11 and may press a STOP key U12b, a RESTART key U12c, or a CANCEL key U12d in the job operation section U12 for the selected job.

In the embodiment, to alter the once registered job processing content, the registered jobs are displayed in the descending processing order on the operation and display section 11, but they may be displayed in the ascending processing order.

d. Detailed Setting Processing of Job

Figure 9:
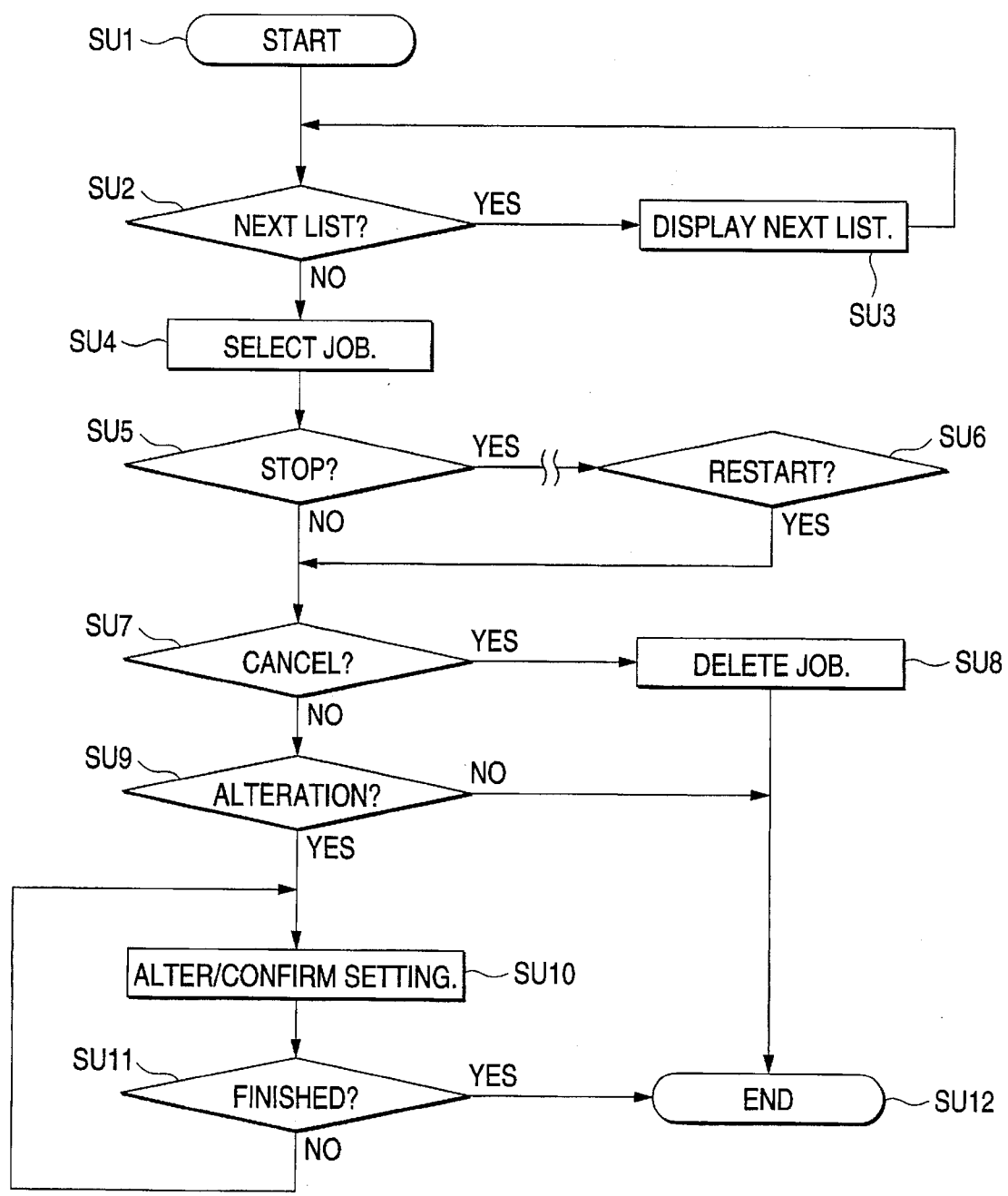
FIG. 9 is a flowchart to explain operation and display of the control panel section in the embodiment.

FIG. 9 is a flowchart to explain operation and display of the control panel section CP for the operator to check or alter detailed setting of a job in the embodiment.

First, the operator can know the job being processed and other jobs in a processing wait state from the display contents of the job listing section U11. For example, to perform processing alteration, setting alteration, and check for job-2 in FIG. 8, the operator touches the job-2 display point of the job listing section U11 for reverse displaying job-2 at step SU4. This enables the operator to check job-2 for setting on display of the job setting and display section U2 and further alter the processing and setting contents. However, if a desired job is not contained in the current job listing section U11, the operator selects the NEXT LIST key U12e in the job operation section U12 and updates the contents of the job listing section U11 at step SU3.

To perform processing alteration for the reverse-displayed job, the operator selects any of the STOP key U12b at step SU5, the RESTART key U12c at step SU6, or the CANCEL key U12d at step SU7 in the job operation section U12.

By the way, if it becomes necessary to alter the setup contents of the job being processed, continuing the job with the current setup contents is meaningless. Therefore, in such a case, the operator selects the STOP key U12b and alters predetermined setup contents, then selects the RESTART key U12c, whereby processing of the selected job can be continued with new setup contents. If the operator selects the CANCEL key U12d, the reverse-displayed job is deleted at step SU8.

On the other hand, to alter the setup contents, the operator selects the ALTERATION key U12a in the job operation section U12 at step SU9. Upon completion of altering the setup contents, the operator selects the SETTING FINISHED key U21 in the job setting and display section U2, whereby the alteration of the setup contents of the job is completed at step SU11.

Figure 10:
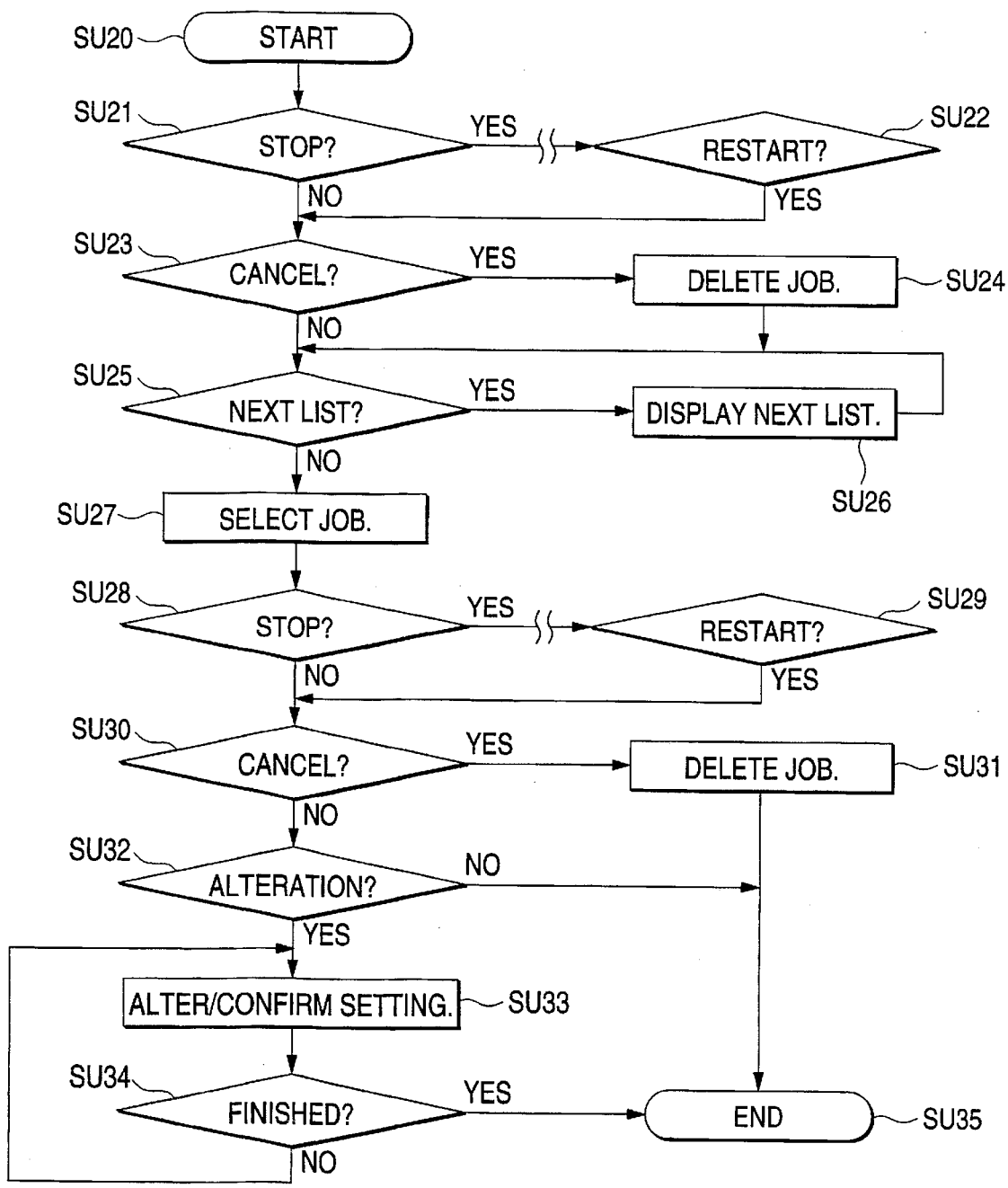
FIG. 10 is a flowchart to explain operation and display of the control panel section for giving a processing alteration instruction for the job being processing in the first embodiment.

By the way, to make some alteration for the job being processed, it is desirable that an alteration be specified in as short a time as possible. In the description given so far, after a desired job is selected, subsequently an alteration instruction is given; however, to select the job being processed, the job to be selected is previously known, thus the job selection step is skipped and a desired processing alteration instruction is directly given, whereby the work time for a sequence of steps of "job selection" to "specification of alteration" can be shortened. FIG. 10 is a flowchart to explain operation and display of the control panel section PC considering the point.

To make processing alteration for the job being processed, the operator selects the STOP key U12b at step SU21, the RESTART key U12c at step SU22, or the CANCEL key U12d at step SU23 in the job operation section U12. If it becomes necessary to alter the setup contents of the job being processed, continuing the job with the current setup contents is meaningless, as described above. Therefore, in such a case, the operator selects the STOP key U12b and alters predetermined setup contents, then selects the RESTART key U12c, whereby processing of the selected job can be continued with new setup contents.

If the operator selects the CANCEL key U12d, immediately the remaining processing of the job being processed is stopped, thereby deleting the job, and a shift is made to processing of the next job at step SU24. Step SU25 and the later steps are similar to those in FIG. 9 and will not be discussed again. That is, on the flow shown in FIG. 10, steps SU21–SU25 are processing for the job being processed and step SU25 and the later steps are processing for the job selected through the job listing section U11 (as in FIG. 9).

In the example shown in FIG. 10, a processing alteration can be directly specified only for alteration display for the job being processed without selecting and reverse displaying of a desired job through the job listing section U11. However, in FIG. 9, when the operator does not select a job, a similar effect can also be produced if the job being processing is always reverse-displayed.

A-3. Modification of First Embodiment

A job management table JT as shown in FIG. 11 is used for management of altering the processing order among a plurality of jobs, selecting an arbitrary job and altering its processing setup contents, etc. Here, management items of the job management table JT shown in FIG. 11 will be discussed.

1) Job number: Identification number given when a job is accepted and registered.

2) Job mode: The processing mode of the accepted job is entered. Here, the job mode includes COPY corresponding to the copy function, PRINT corresponding to the print function, FAX-S corresponding to the FAX transmission function, and FAX-R corresponding to the FAX reception function. The job mode is determined by the operator who selects a job function and parameters to set processing conditions through the operation and display section 11. When a START button is pressed and the job is accepted, the mode corresponding to the function is written into the job management table JT. If a job request such as a print function or FAX reception function is made via the local area network 6 or the public communication lines 9, when reception of image data concerning the job is complete and the image data is stored in the image data storage section 16 in FIG. 2, the job mode is set. To apply the table to copiers, printers, FAX machines, etc., of single-function machines, the item need not be provided for management.

3) Processing conditions: Are conditions for the job to operate as requested by the user or conditions set automatically by the system. As shown in FIG. 11, parameters such as magnification, paper size, and the number of copies are written. Like the job number and the job mode, the management item is set when the job is accepted and registered. If a processing condition alteration instruction is given after the job number is identified, the contents of the "processing conditions" management item are updated.

4) Already output processing amount: The complete output processing amount is written in page units in the example. This management item is updated each time job output processing is changed.

By the way, amount units are the number of pages, the number of copies, the time, etc.; basically they become common to all accepted jobs, but different units may be adopted for each job and the units may be changed as the job proceeds.

5) State: The state of the job, namely, the processing, processing wait, or processing stop state is entered. Since a completed job is deleted from the management table, no processing end state may be entered. This management item is updated each time job output processing is changed, and is also updated upon completion of alteration the processing contents or setup items for the job selected on the job listing section U11 or the job operation section U12.

6) Processing order: The output processing order is entered. This management item is updated each time processing of a registered job is completed. In the first embodiment, the output processing order is determined by the job amount at the time each job is registered; instead, the output order may be determined in the registration order. In the modification, the "processing order" management item is updated independently of the contents of the "state" management item of each job. For example, even a job placed in the processing stop state to change its processing conditions is controlled so that it is restored to the processing wait state immediately when changing of the processing conditions is complete. (This will be discussed later in detail.)

The job management table JT shown in FIG. 11 indicates that the jobs being processed are the copy function job with job number 1 and the FAX transmission job with job number 7. The reason why these two jobs are processed in parallel is that although all the jobs with job numbers 1–6 require printout processing in the image output section 14 in FIG. 2, the job with job number 7 may be processed in the communication control section 20 and can be processed without contending with any other jobs. The print function job with job number 2 was registered earlier, but has a large job amount. Therefore, it is assigned the fifth processing rank. The copy function job with job number 5 has the smallest job amount in the table, but is in the processing stop state, thus is not processed. The reason why the processing rank of this job is 0 is to allow the job to be processed with precedence over other jobs as soon as the processing stop state is released.

Next, a procedure of altering the processing contents or the processing conditions for a desired job using the job management table JT shown in FIG. 11 will be outlined.

(1) First, a job whose processing method or processing conditions are to be altered is selected. This selection process is executed as in steps SU2–SU4 in FIG. 9 or steps SU21–SU27 in FIG. 10. At steps SU21–SU24 in FIG. 10, it is assumed that the job to be selected is the job being processed, thus a job in processing is selected in accordance with the steps.

(2) Next, the processing state of the selected job is set to the "stop state," because it is desired that the amount of operation processed under the old setup conditions be as small as possible for the job whose processing method or processing conditions are to be altered. If the job is in the "processing wait state" at the selection time, its processing conditions can be altered as in this state. But if the processing turn of the job comes during the altering operation, it is expected that the job will be processed under previous setup conditions although alteration is being effected. Therefore, such a job is also placed in the "stop state."

(3) Upon completion of the changing, the processing state of the job is restored to the "processing wait state." After this, processing of the job is executed according to the processing order.

Figure 12:
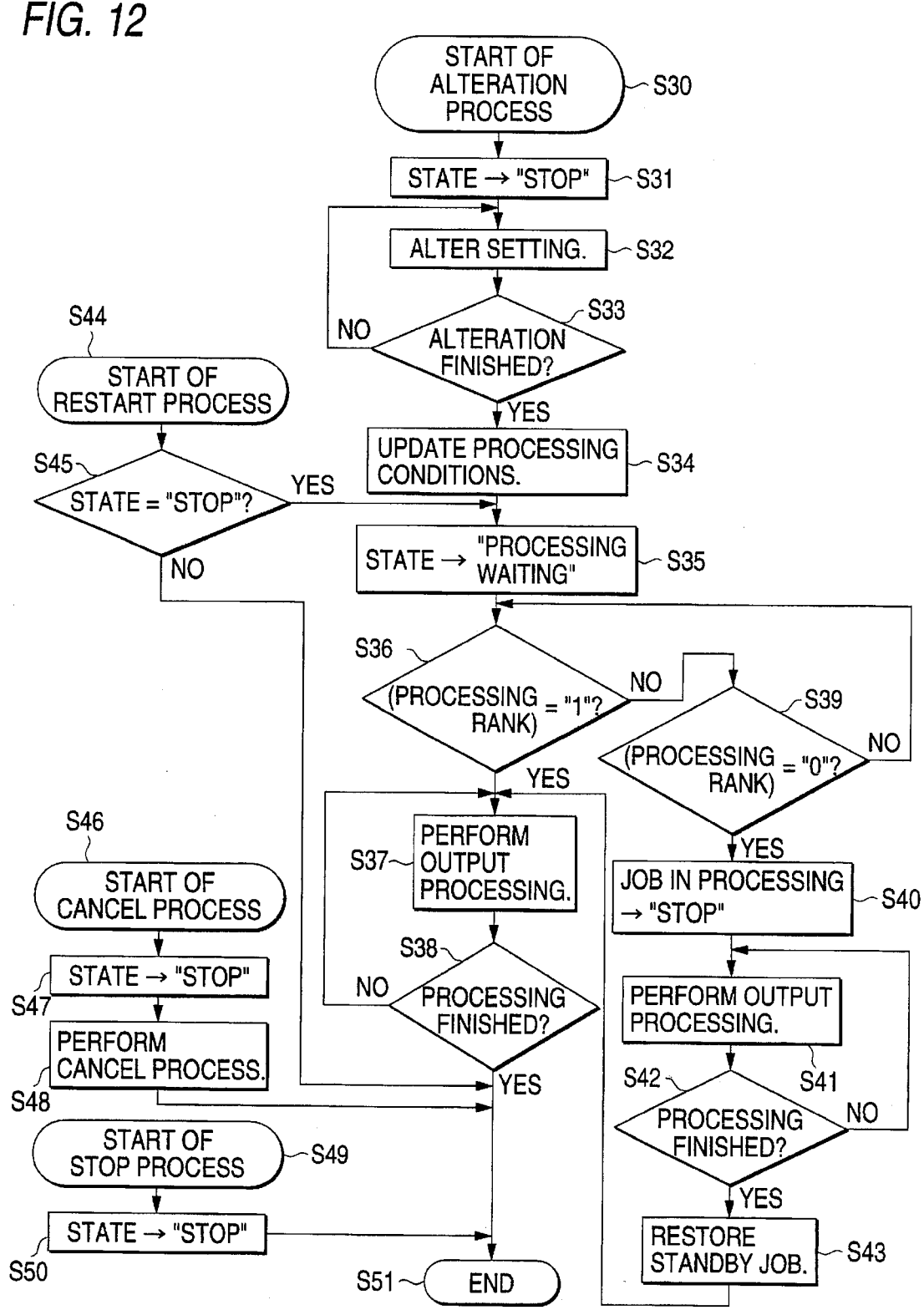
FIG. 12 is a flowchart to explain an altering operation and processing state transition after a desired job is selected.

Next, alteration operations for the job and the processing state transition after the desired job is selected will be discussed in detail using a flowchart shown in FIG. 12.

First, when the ALTERATION key U12a in the job operation section U12 is pressed, an alteration process is started at step S30. The job processing state is set to the "stop state" at step S31, as described above. Then, necessary alterations are made in the job setting and display section U2 in FIG. 7. When the changing is complete and the QUIT SETTING key U21 is pressed, the processing conditions are updated at steps S33 and S34 and subsequently the job processing state is restored to the "processing wait state" at step S35. The processing rank is checked and the "processing wait state" continues until the processing rank becomes highest. When the processing rank becomes highest (processing rank="1") at step S36, the job is processed under the new processing conditions at steps S37 and S38.

On the other hand, if the processing rank of the job becomes highest during the changing or if the job being executed is selected and changing is performed and then the job is placed in "processing wait," the processing rank of the job becomes "0." Thus, control proceeds via steps S36 and S39 to step S40 at which immediately the job being processed is stopped and processing of that job takes precedence over the job. After completion of processing of the job, processing of the interrupted job is continued at steps S41–S43.

Although the order is thus changed, the processing method of jobs not processed in order is not limited to the example. For example, if there is a job being executed at the alteration process completion time, following the job, the job for which the alteration process has been executed may be processed.

By the way, if the RESTART key U12c in FIG. 8 is selected, a restart process is started at step S44. At this time, if the processing state of the corresponding job is not "stop state," the key selection is meaningless, thus no operation is performed and the process is terminated or a warning or an error message is displayed on the display section. When the job is in the "stop state," its processing state is restored to the "processing wait state" at step S35. After this, the job is processed at the above-described steps.

When the CANCEL key U12d in FIG. 8 is selected, a cancel process is executed at step S46. Since the cancel process may be selected also for the job being processed, first the job processing state is set to the "stop state" at step S47. If the selected job is the job being processed its processing is interrupted at the step. Then, processing of the job is assumed to terminate and the job is deleted from the job management table JT. Further, if a job lower in the processing order than the deleted job exists, the processing rank is changed at step S48, and the cancel process is complete. When the STOP key U12b in FIG. 8 is selected, a stop process is started at step S49 and the processing state of the corresponding job is set to the "stop state" at step S50.

Figure 13:
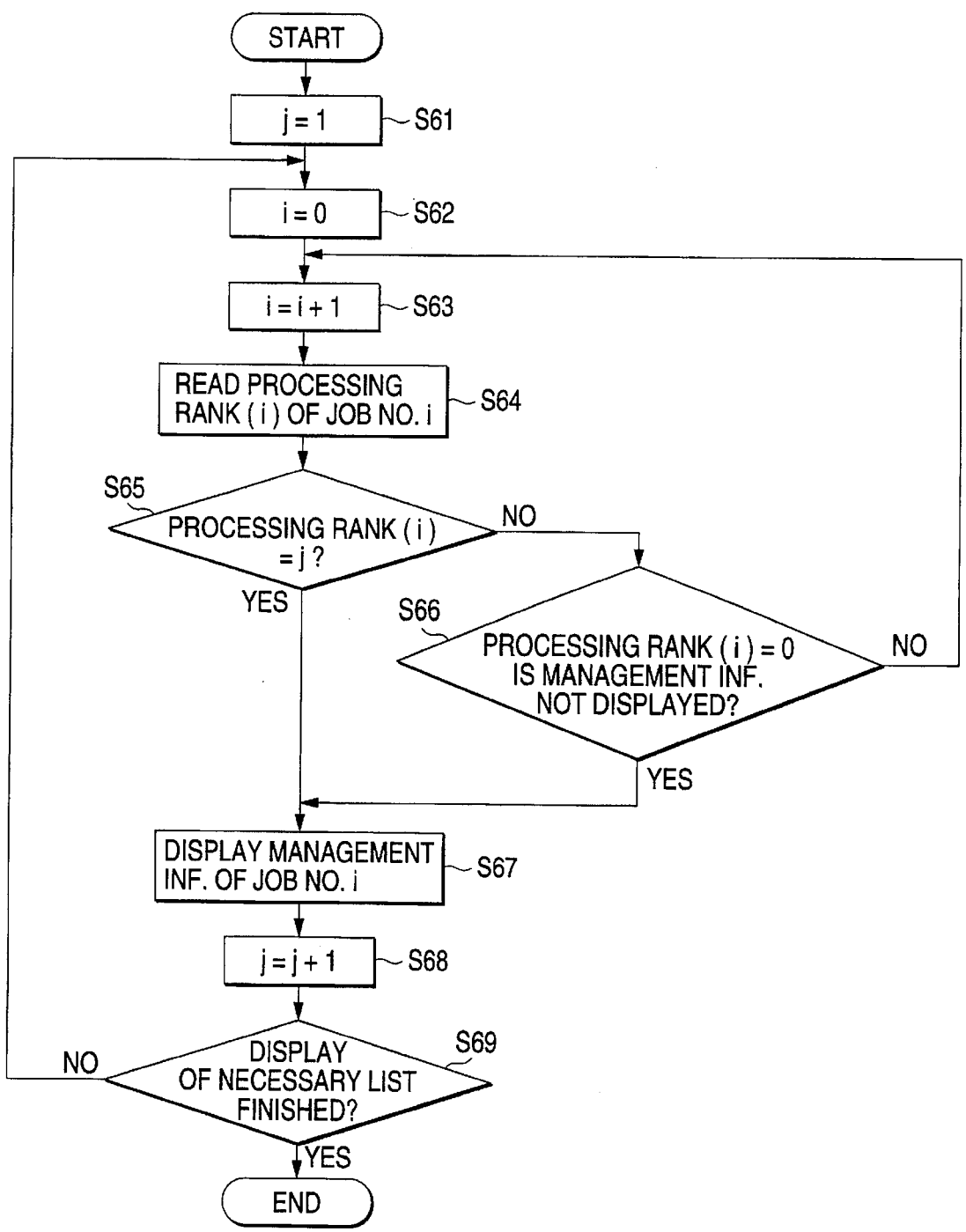
FIG. 13 is a flowchart for preparing a job list in the output processing order.

Although the job listing section U11 shown in FIG. 7 displays details of jobs in the output processing priority order of the jobs as described above, such display can also be produced if the job management table JT shown in FIG. 11 is used. Job display in the processing order using the job management table JT shown in FIG. 11 will be discussed below:

FIG. 13 is a flowchart for preparing a job list in the output processing order. First, a variable j indicating the display rank is set to 1 at step S61. Next, a variable i is cleared, then is incremented by one and the processing rank (i) of job number i is read at step S64. Whether or not the read processing rank (i) equals the variable j is determined. If the determination result is NO, control goes to step S66 at which whether or not the processing rank (i) is 0 is determined. If the determination is NO, control returns to step S63. Steps S63–S66 are thus circulated until the determination at step S65 or S66 becomes YES. If the determination at step S65 becomes YES, namely, the processing rank (i) matches the variable j (the number to be displayed at present, namely, the display rank), necessary pieces in the management information corresponding to the job number i are read from the job management table JT and displayed on the job listing section U11 at step S67. On the other hand, if the processing rank (i) is "0" and its corresponding management information is undisplayed at step S66, necessary information is also read from the job management table JT and displayed on the job listing section U11 at step S67 as in the above.

After step S67 is complete, the variable j is updated at step S68 and control returns to step S62 at which processing is repeated as described above. The jobs are thus displayed according to the processing priority order.

Second Embodiment

B-1. Configuration of Second Embodiment

Next, a second embodiment of the invention will be discussed. In the first embodiment, jobs are so displayed as to be correlated with the processing order to facilitate identification of a job whose processing content is to be altered. On the other hand, if the jobs are displayed separately for respective job functions (copy function, print function, FAX transmission function, FAX reception function, etc.,), often they are also grasped easily and conveniently.

Then, in the second embodiment, jobs in the job list U11 in FIG. 7 are so displayed that they are classified in accordance with functions. A general block diagram of an image forming apparatus according to the second embodiment is similar to that in FIG. 2 and will not be discussed again.

Figure 14:
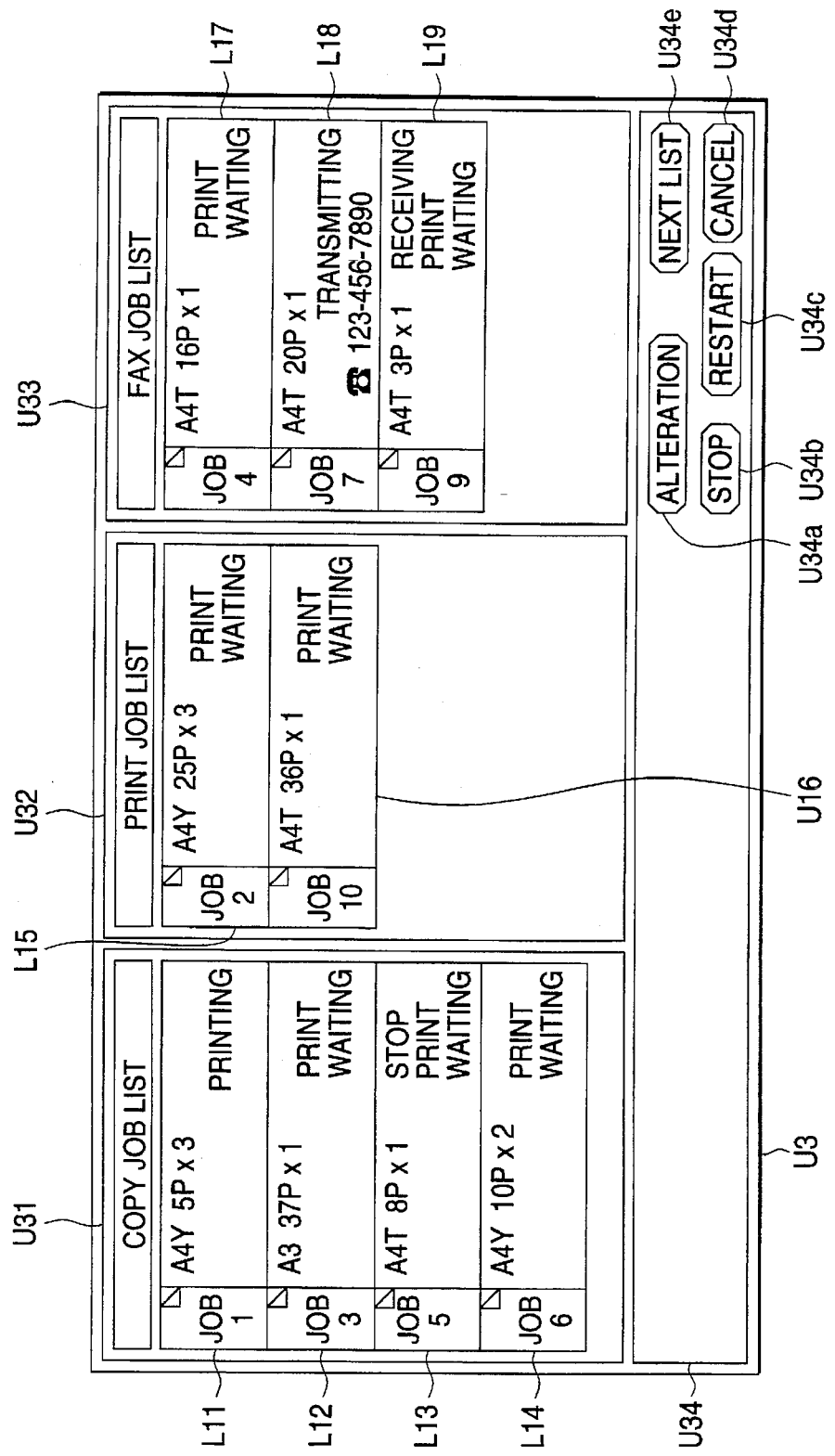
FIG. 14 is an illustration to show a control panel section in a second embodiment.

FIG. 14 is an illustration to show a control panel section U3 in the second embodiment. The control panel section U3 is made up of job listing sections U31–U33 capable of classifying jobs in processing and waiting for processing by job function for display and a job operation section 34. The job listing sections U31, U32, and U33 display copy function jobs, print function jobs, and FAX function jobs respectively. In the example in FIG. 14, L11–L14 display four top jobs in the job number order among the copy function jobs in the job management table JT shown in FIG. 11. Likewise, L15 and L16 show top jobs in the job number order among the print function jobs stored in the job management table JT and L17–L19 show top jobs in the job number order among the FAX function jobs stored in the job management table JT. In this case, as in the first embodiment, the jobs in each job list may be so displayed as to be correlated with the processing order. The FAX function jobs may be furthermore classified into reception jobs and transmission jobs.

Next, the job operation section U34 includes menu selection keys such as a ALTERATION key U34a, a STOP key U34b, a RESTART key U34c, a CANCEL key U34d, and a NEXT LIST key U34e as with the job operation section U12 in FIG. 7.

To check and alter the job processing content, the operator selects and identifies a desired job, then makes necessary alterations, as in the first embodiment. When a desired job is selected, the processing content of the job is displayed on a job setting and display section (not shown).

B-2. Operation of Second Embodiment

Figure 15:
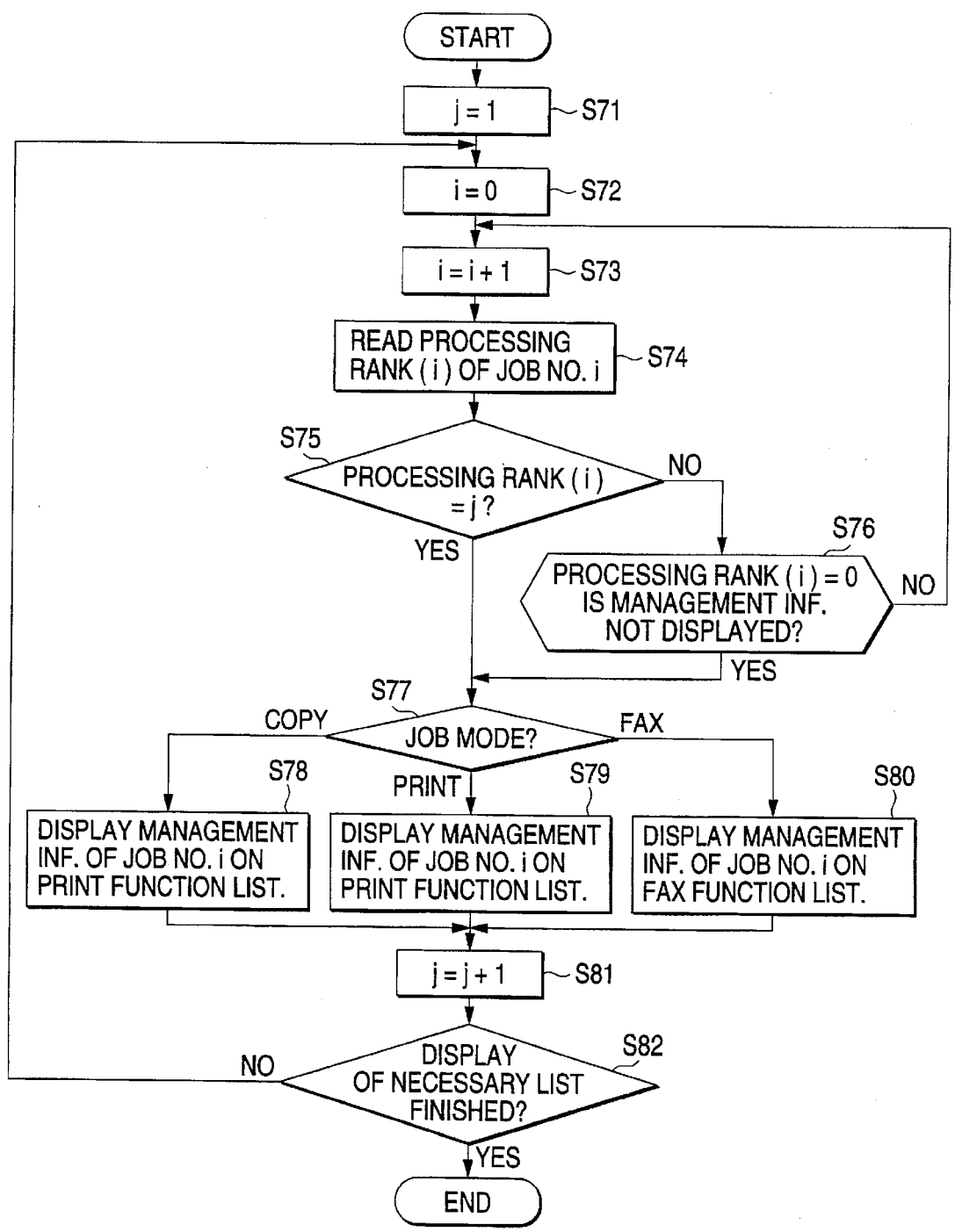
FIG. 15 is a flowchart for preparing job listing sections in the second embodiment.

FIG. 15 is a flowchart to show a preparation process of the job listing sections U31–U33 in the second embodiment. In the process shown in FIG. 15, while job number i is updated, necessary information on jobs is read from the job management table JT in the job processing order at steps S71–S76, which are the same as steps S61–S66 in the flowchart shown in FIG. 13. In the second embodiment, to display job lists for each job function, job mode information is read from the job management table JT and an appropriate job list is prepared in response to the mode at step S77. When the job mode information indicates a copy function, management information is displayed on the job listing section U31 at step S78. When the job mode information indicates a print function, management information is displayed on the job listing section U32 at step S79. When the job mode information indicates a FAX function, management information is displayed on the job listing section U33 at step S80. When the management information is thus displayed on the job listing sections U31–U33, display rank j is updated at step S81. If necessary job lists are not completed, control returns to step S72 and the job corresponding to the updated display rank is repeatedly retrieved until the job lists are completed at step S82.

B-3. Modification of Second Embodiment

Thus, in the second embodiment, jobs are classified and displayed with attention paid to the processing functions in the image forming apparatus. Alternatively, attention may be focused on the number of original document sheets, the number of output sheets, or the paper size to classify and display jobs.

If attention is focused on print function jobs, as discussed for the code data development section 21 in FIG. 2 in the first embodiment, the print function connected to a local area network 6 enables determination as to what page description language the received code is described in. Thus, the print function jobs can also be furthermore classified for job listing according to the type of page description language.

By the way, if attention is focused on the processing functions for listing jobs, as seen in FIG. 14, the greater the number of processing functions on which attention is focused, the larger the total display area of the job listing sections. On the other hand, the area of the control panel section CP is limited, thus it becomes hard to list jobs in a system providing a large number of processing functions.

In such a case, a function job list may be shown for the operator and a job list of each function may be changed for display according to an instruction from the operator.

Figure 16:
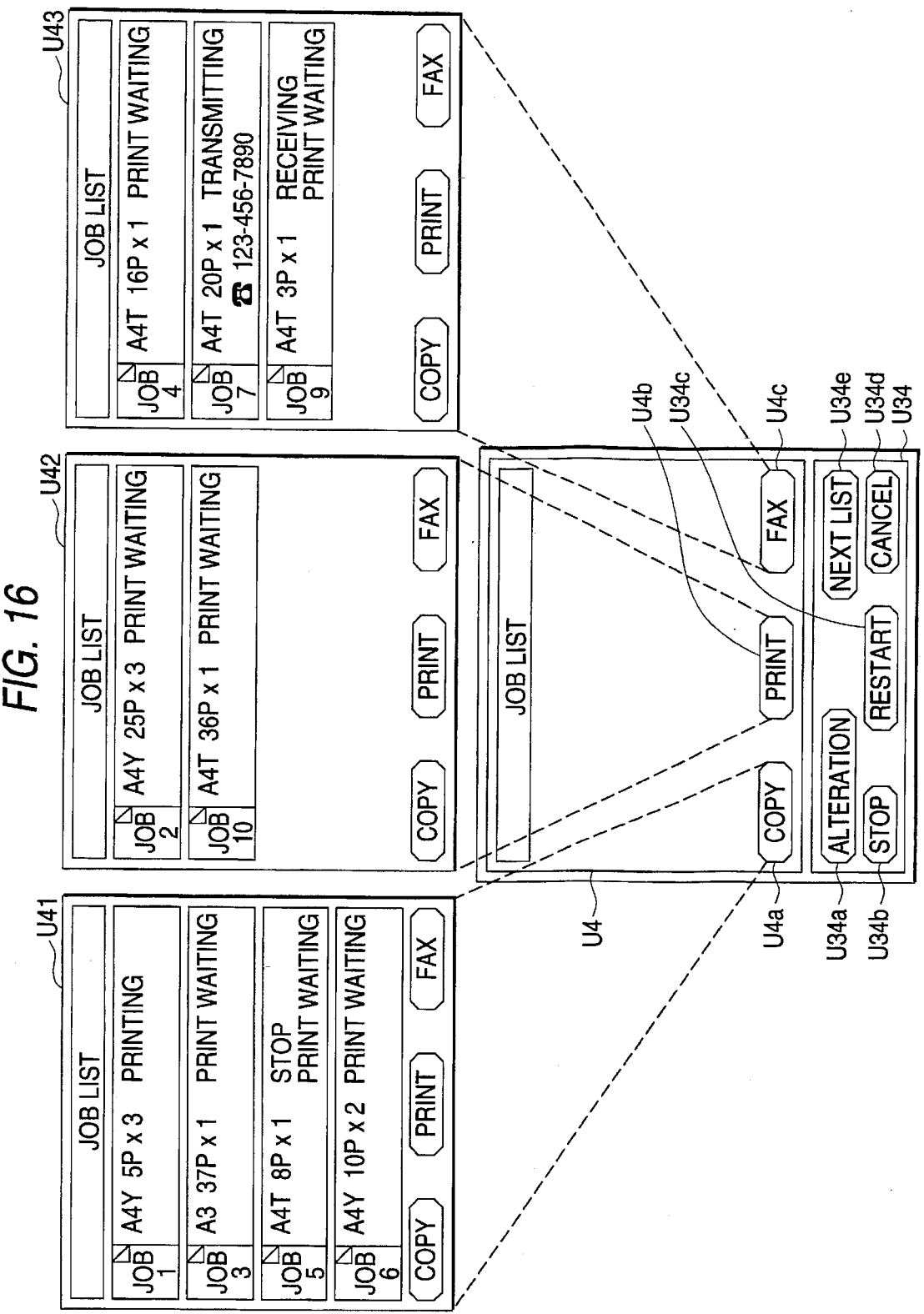
FIG. 16 is an illustration to show a control panel section which enables the operator to designate the attribute of a processing function for displaying a job list for each function.

FIG. 16 is an illustration to show a control panel section CP which enables the operator to specify the attribute of a processing function for displaying a job list for each function. A job operation section U34 is the same as those previously described with reference to FIGS. 7 and 14; keys identical with those in FIGS. 7 and 14 are denoted by the same reference numerals in FIG. 16.

In FIG. 16, function selection keys U4a, U4b, and U4c are added to a job listing section U4. If the operator selects the COPY function selection key U4a, the key is reverse-displayed and a job listing section U4 changes to a copy function job listing U41. If the operator selects the PRINT function selection key U4b, the key is reverse-displayed and the job listing section U4 changes to a print function job listing section U42. Likewise, if the operator selects the FAX function selection key U4c, the key is reverse-displayed and the job listing section U4 changes to a FAX function job listing section U43. On the other hand, when no function selection keys are selected, no function job lists are displayed on the job listing section U4.

By the way, each job listing section U41–U43 displayed when the operator selects the corresponding function attribute may display the jobs so that they are correlated with the processing order as in the first embodiment or in the job number order for each function as in the second embodiment.

Figure 17:
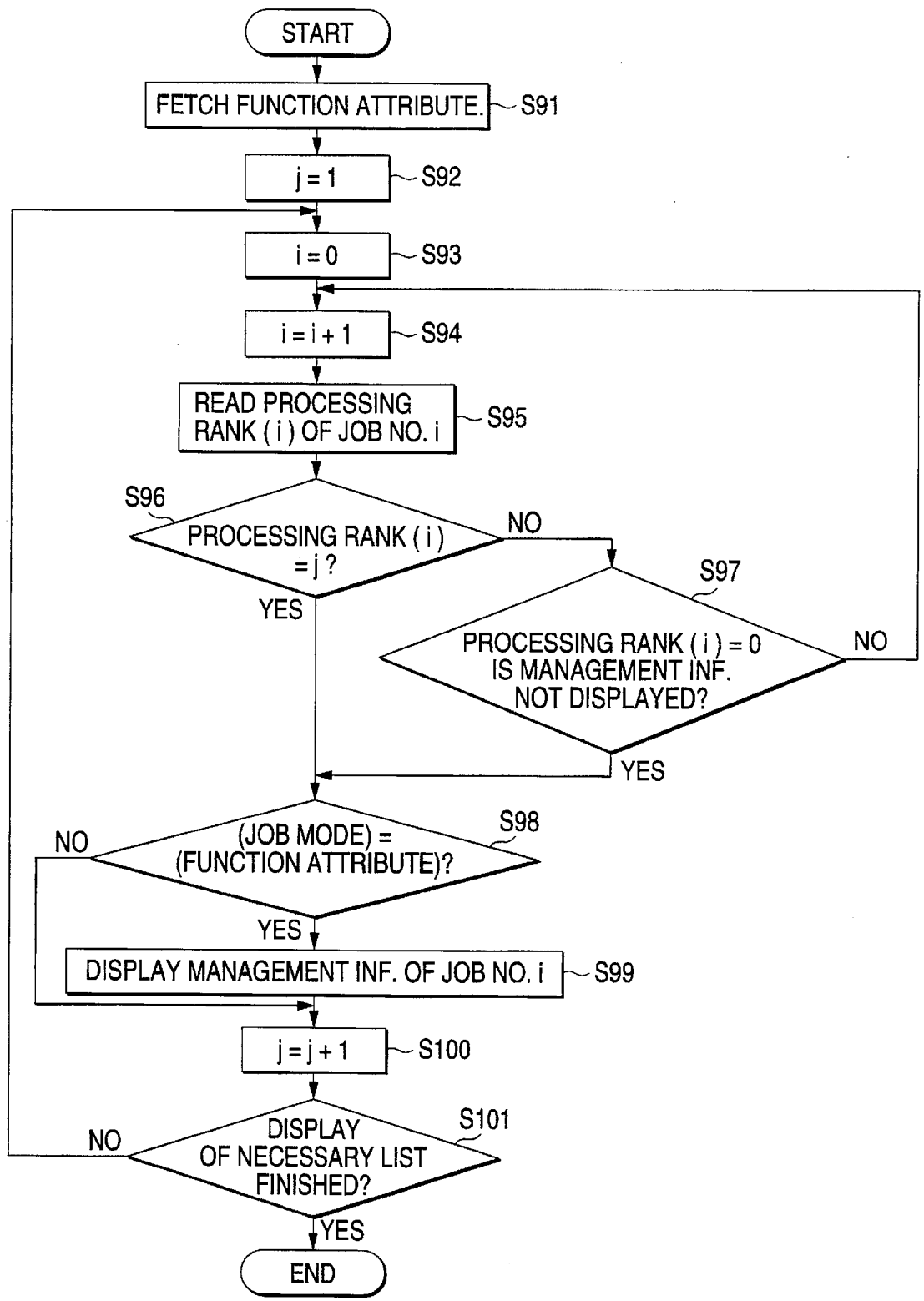
FIG. 17 is a flowchart for preparing a job listing section when the operator selects a function attribute.

FIG. 17 is a flowchart for preparing one of the job listing sections U41–U43 when the operator selects a function attribute. Job listing according to the function will be discussed with reference to FIG. 17.

First, when the operator selects any of the function selection keys in the job listing section U4, the function attribute information corresponding to the selected function selection key is fetched at step S91. For example, when the function selection key U4b is selected, the function attribute information becomes "print function." As on the flowcharts shown in FIGS. 13 and 15, while job number i is updated, necessary management information is read from a job management table JT in the priority order at steps S92–S97. When display position number, which is also processing rank number, j, matches processing rank information (i) of the job number i, job mode information is read from the job management table JT and whether or not it matches the function attribute information fetched at step S91 is determined at step S98. Only if they match, necessary management information is displayed on the job listing section U4, whereby any of the job listing sections U41–U43 corresponding to the function selection key is prepared at step S99. Next, the processing rank number j is updated at step S100 and the steps are repeated until the job list is completed.

Third Embodiment a. Configuration of Digital Copier

Although the composite machines discussed in the first and second embodiments process functions successively according to a predetermined order, the invention can also be applied to an image processing or formation system, etc., that can process a single function or multiple functions in parallel according to a predetermined order. Then, a third embodiment of the invention applied to a digital copier having a single copy function that can perform parallel processing will be discussed.

Figure 18:
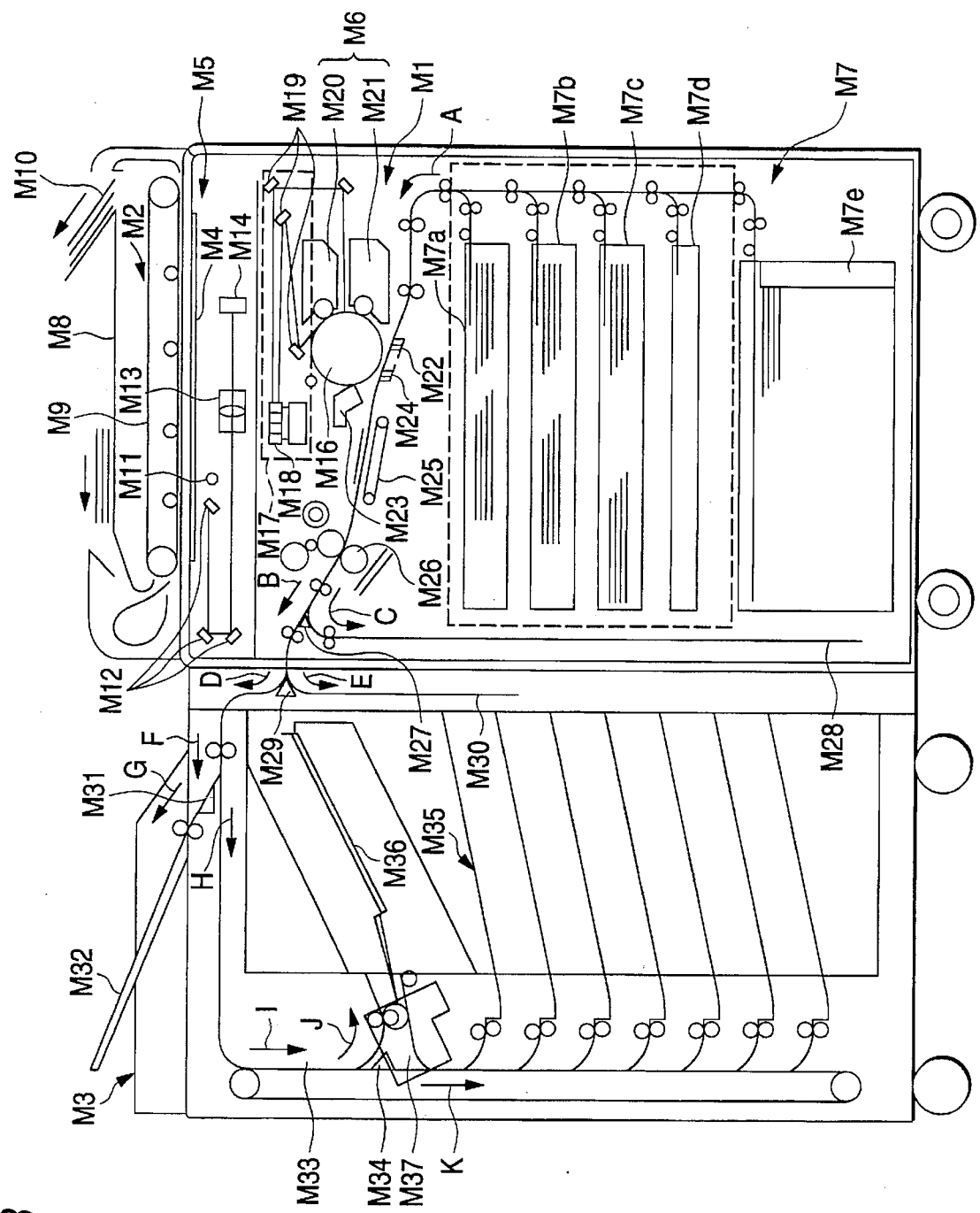
FIG. 18 is a sectional view to show a schematic configuration of a digital copier in a third embodiment.

FIG. 18 is a sectional view to show a schematic configuration of a digital copier of the third embodiment. The main unit shown in the figure consists roughly of an image formation section M1 for forming a toner image corresponding to an original document image on a recording sheet and making a copy, an automatic document feed section M2 for automatically feeding an original document to a document placement face of the image formation section M1, and a postprocessing section M3 for performing postprocessing of sorting, stapling, etc., for recording sheets discharged from the image formation section M1.

The image formation section M1 contains an image read section M5 for scanning an original document placed on platen glass M4 of the document placement face for reading an original document image, a print section M6 for forming a toner image corresponding to the original document image on a recording sheet based on image information provided through the image read section M5, and a feed section M7 for feeding a recording sheet into the print section M6, the sections M5–M7 being disposed from top to bottom in order.

The automatic document feed section M2 is disposed so as to cover reclosably the platen glass M4 placed on the top of the digital copier. An original document placed on a document placement tray M8 is sent onto the platen glass M4 one sheet at a time in order by means of a feed roller (not shown) and a conveyor belt M9 and an original document image is read, then the original document is discharged to a document discharge tray M10 by means of the conveyor belt M9 and a discharge roller (not shown).

The image read section M5 comprises an exposure lamp M11, a plurality of reflectors M12, a lens M13, an image sensor M14, etc., as an optical system. The exposure lamp M11 and the reflectors M12 are moved along the platen glass M4, reflected light from an original document is focused to the image sensor M14, and contrast of the original document image is converted into an electric image signal, which then is converted into digital image data by an A/D conversion circuit, etc., provided in the image read section M5. This digital image data is supplied to an image processing section 51 described later (see FIG. 19) and undergoes predetermined signal processing, then is supplied to the print section M6.

The print section M6 forms a toner image on a recording sheet by known electrophotography according to the digital image data from the image processing section 51; the surface of a photosensitive drum M16 uniformly charged by a charger M15 is exposed to laser light from a laser exposure device M17 for forming an electrostatic latent image.

The laser exposure device M17 is made up of a laser device (not shown) such as a semiconductor laser for modulating a drive current based on the image data from the image read section M5, a rotating polygon mirror 18 for polarizing the laser light from the laser device periodically in a direction perpendicular to the move direction of the surface of the photosensitive drum M16, a reflector M19, etc.

The electrostatic latent image on the photosensitive drum M16 is developed by a developing machine M20 or M21 to form a toner image in a desired color on the photosensitive drum M16. This toner image is transferred to a recording sheet by a transfer section M22. In this case, the recording sheet is sent along path A from any of trays M7a–M7e in the paper feed section M7. The trays M7a–M7c are paper feed trays for storing sheets different in size, the tray M7d is an intermediate tray for temporarily storing a recording sheet for double-side copying, and the tray M7e is a large-capacity tray for storing several hundred recording sheets.

Residual toner on the surface of the photosensitive drum M16 after the transfer is removed by a cleaning section M23. The recording sheet after the transfer is stripped off from the photosensitive drum M16 by a stripping section M24, is transported to a fixing section M26 on a conveyor M25, and undergoes a fixing process. The paper path after the fixing is switched to either of path B going to the postprocessing section M3 and path C going to the temporary tray M7d via an inverting section M28 for double-side copying. For double-side copying, the sides of a recording sheet are inverted by the inverting section M28 and the recording sheet is passed through the intermediate tray M7d, then again fed into the print section M6 along the path A. At this time, a toner image is formed on the opposite side of the recording sheet, then is sent to the postprocessing section M3.

The recording sheet discharged to the postprocessing section M3 from the print section M6 is switched to either path D or E by a switch gate M29. The recording sheet going to the path D is sent to path F with the image side upside intact and the recording sheet going to the path E is turned upside down by the inverting section M30 and is sent to the path F.

The recording sheet advancing on the path F is distributed by a switch gate M31 to path G leading to a top tray M32 and path H for postprocessing. The recording sheet going to the path H is transported downward along path I on a vertical conveyor belt M33 and is distributed by a switch gate M34 to path J for stapling and path K leading to a sorter bin M35. The recording sheet going to the path J is discharged into a holding tray M36. When a necessary number of recording sheets are accumulated, the sheets are stapled with a stapler M37. The stapled recording sheets are again transported downward on the vertical conveyor belt M33 and discharged to a predetermined position in the sorter bin M35.

b. Hardware Configuration

Figure 19:
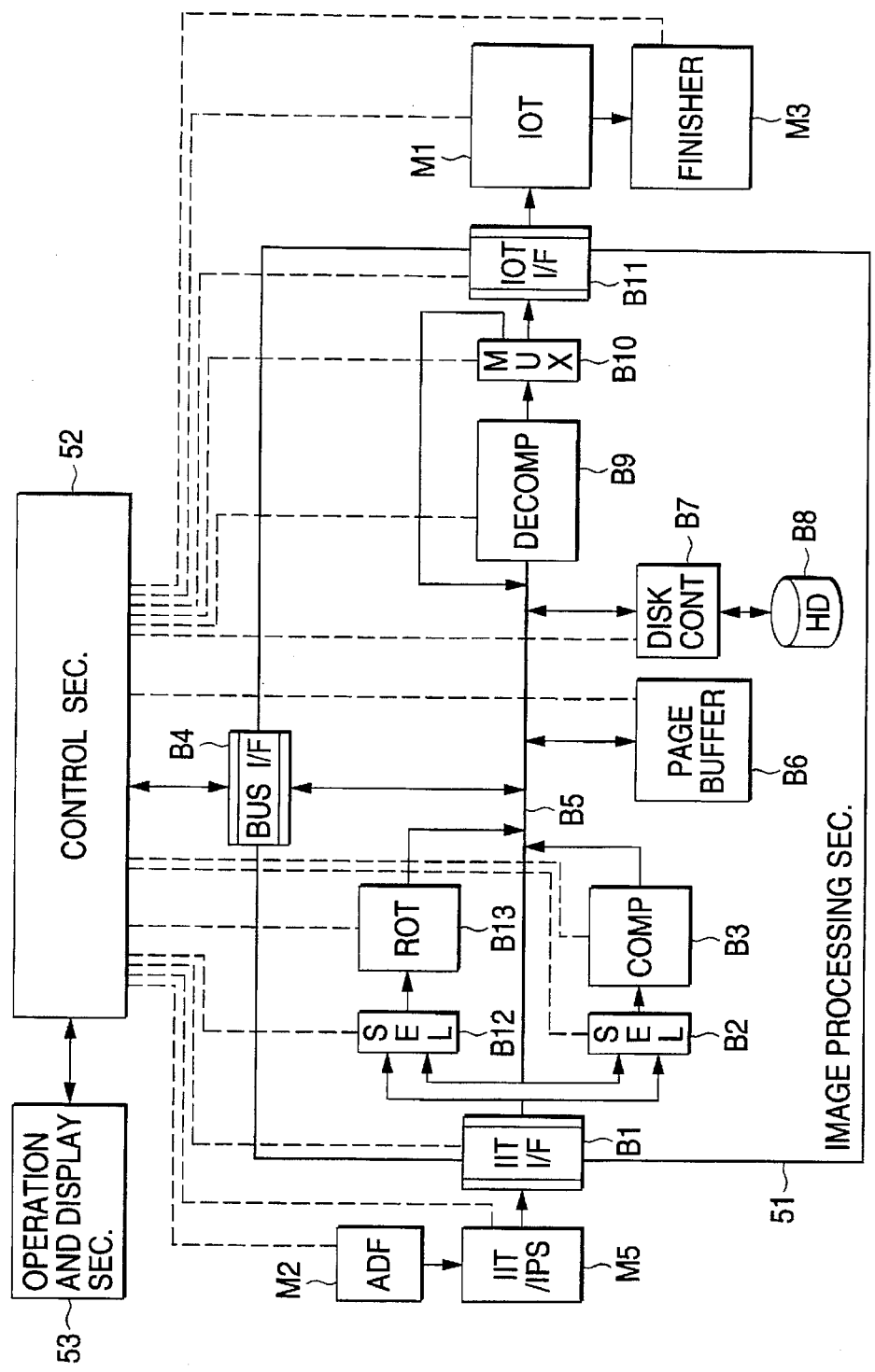
FIG. 19 is a block diagram to show the hardware configuration of the digital copier in the third embodiment.

FIG. 19 is a block diagram to show the hardware configuration of the digital copier of the third embodiment.

The image processing section 51 shown in the figure is connected to a control section 52 via a bus interface B4, the image read section (IIT/IPS) M5 via an IIT interface B1, and the image formation section (IOT) M1 via an IOT interface B11. The automatic document feed section M2 is connected to the image read section M5 and the image formation section (IOT) M1 is connected to the postprocessing section (FINISHER) M3.

The image processing section 51 comprises a compressor B3 for compressing image data, a rotator B13 for rotating image data in 90 units, a page buffer B6 for storing image data, and a selector B2 for selecting image data to be input to the compressor B3 from image data input via the IIT interface B1 and image data output from the page buffer B6 in addition to the IIT interface B1, the IOT interface B11, and the bus interface B4 mentioned above. It further includes a selector B12 for selecting image data to be input to the rotator B13 from image data input via the IIT interface B1 and image data output from the page buffer B6, an internal bus B5 on which image data and control data flow, a hard disk B8 for temporarily storing image data, a disk controller B7 for controlling the hard disk, an expander B9 for expanding image data, and a multiplexer B10 for switching the image data output from the expander B9 to output via the IOT interface B11 to the image formation section M1 or restoration to the page buffer B6.

The processing sections B1–B13 process image data under the control of the control section 52 as follows:

First, when the operator sets an original document on the platen in the automatic document feed section M2 or the image read section M5 and sets the job operation through a UI (user interface) on an operation and display section 53, then presses a start button, the image read section M5 reads image information of the original document by photoelectric conversion. While converting the image information into digital image data and applying image processing, the image read section M5 outputs the image data via the IIT interface B1. This image data is compressed by the compressor B3 and is stored in the page buffer B6 in sequence. If rotation processing of the image data is performed at the input time, the input image data is rotated by the rotator B13 at a desired angle and is once stored in the page buffer B6. Further, the rotated image data is compressed by the compressor B3 and is stored in the page buffer B6 in sequence.

At the time, if the image data can be output directly, it is transferred from the page buffer B6 via the expander B9 and the IOT interface B11 to the image formation section M1 and postprocessing is performed in the postprocessing section. At the same time, a write of the image data onto the hard disk is started. On the other hand, if the image data cannot directly be output, a write of the image data onto the hard disk is only executed. By the way, the image data is output from the page buffer B6; to store the image data in the page buffer B6, it is transferred from the image read section M5 or the hard disk B8

As the basic output operation of image data, for the first copy, input image data from the image read section M5 is directly output; for the second or later copy, image data read from the hard disk B8 is output. If rotation processing of the image data is applied at the output time, compressed data in the page buffer B6 is once expanded by the expander B9 and is restored to the page buffer B6 through the multiplexer B10, then is subjected to rotation processing by the rotator B13.

On the other hand, the image data output to the IOT interface B11 is input to the image formation section M1, which then generates binary data from the image data, and controls laser light on/off for each pixel based on the binary data. A halftone can also be well reproduced by such laser light control for drawing halftone dots. The page buffer B6 and the processing sections are accessed at the same time by executing bus arbitration of the internal bus B5. They perform processing in a time-sharing manner and input processing and output processing are performed in parallel.

Figure 20:
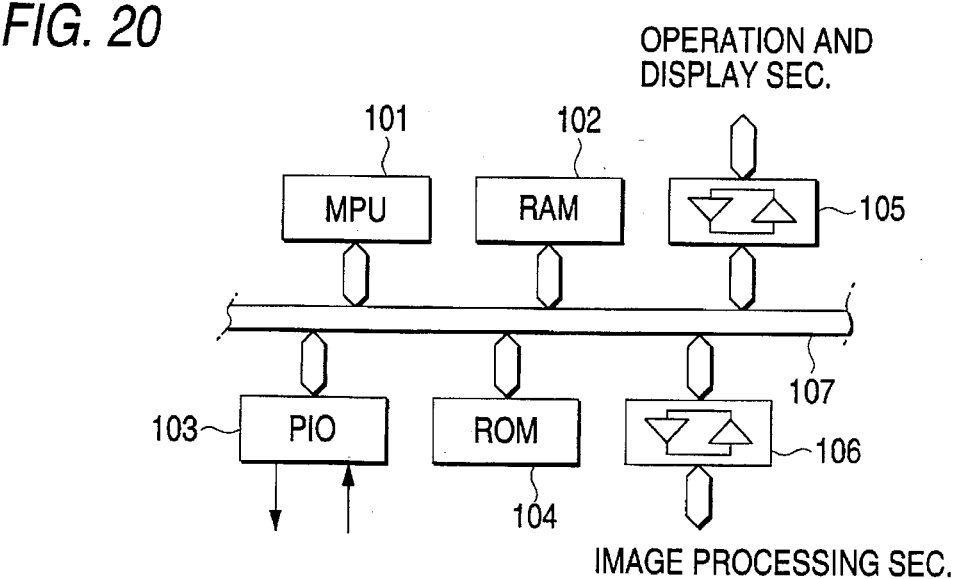
FIG. 20 is a block diagram of a control section of the digital copier in the third embodiment.

Next, FIG. 20 is a block diagram of the control section 52. The control section 52 comprises a microprocessing unit (MPU) 101 as a core. In this case, the MPU 101 controls blocks connected to the control section 52 by a program prestored in a ROM 104. A RAM 102 serves as a working memory of the MPU 101 and also stores the job management table JT discussed in the first embodiment (see FIG. 11), etc.

Control signals from the control section 52 to other blocks are supplied via a peripheral input/output interface PIO 103. An internal bus 107 of the control section 52 to which the MPU 101, the RAM 102, and other components are connected is connected to an internal bus of the operation and display section 53 via a first bidirectional buffer 105, whereby the MPU 101 can directly control the operation and display section 53. Also, the MPU 101 can access registers in the data processing blocks of the compressor B3, the expander B9, the rotator B13, etc., in the image processing section 51 via a second bidirectional buffer 106. Further, the page buffer B6 can also be allocated to a memory space of the MPU for accessing.

Figure 21:
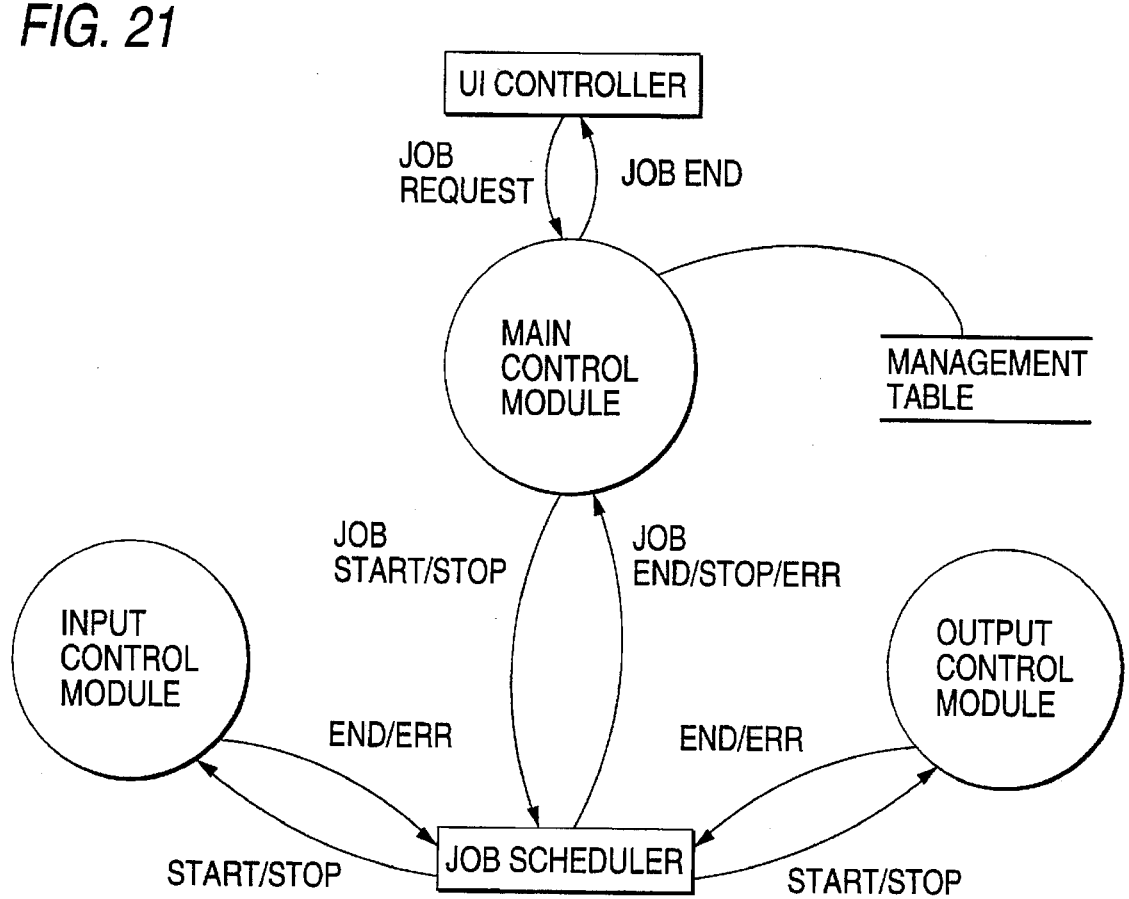
FIG. 21 is a diagram to show a schematic control program configuration of an MPU in the control section in the third embodiment.

Next, FIG. 21 is a diagram to show a schematic control program configuration of the MPU 101. The control program consists roughly of a main control program, an input control program, and an output control program for performing real-time control. Therefore, apparently the control modules can perform control independently of each other. For example, the main control module is a module for accepting specification from the operator through a UI (user interface) controller for controlling the operation and display section 53 and requesting a job scheduler section to execute processing. The input control module is a module for controlling the operation of an image input unit made up of the automatic document feed section M2 and the image read section M5. The output control module is a module for controlling the operation of an image output unit made up of the image formation section M1 and the postprocessing section M3. The job scheduler section controls whether the image input unit and the image output unit are to be operated in synchronization or independently.

C-2. Operation of Third Embodiment

Figure 22:
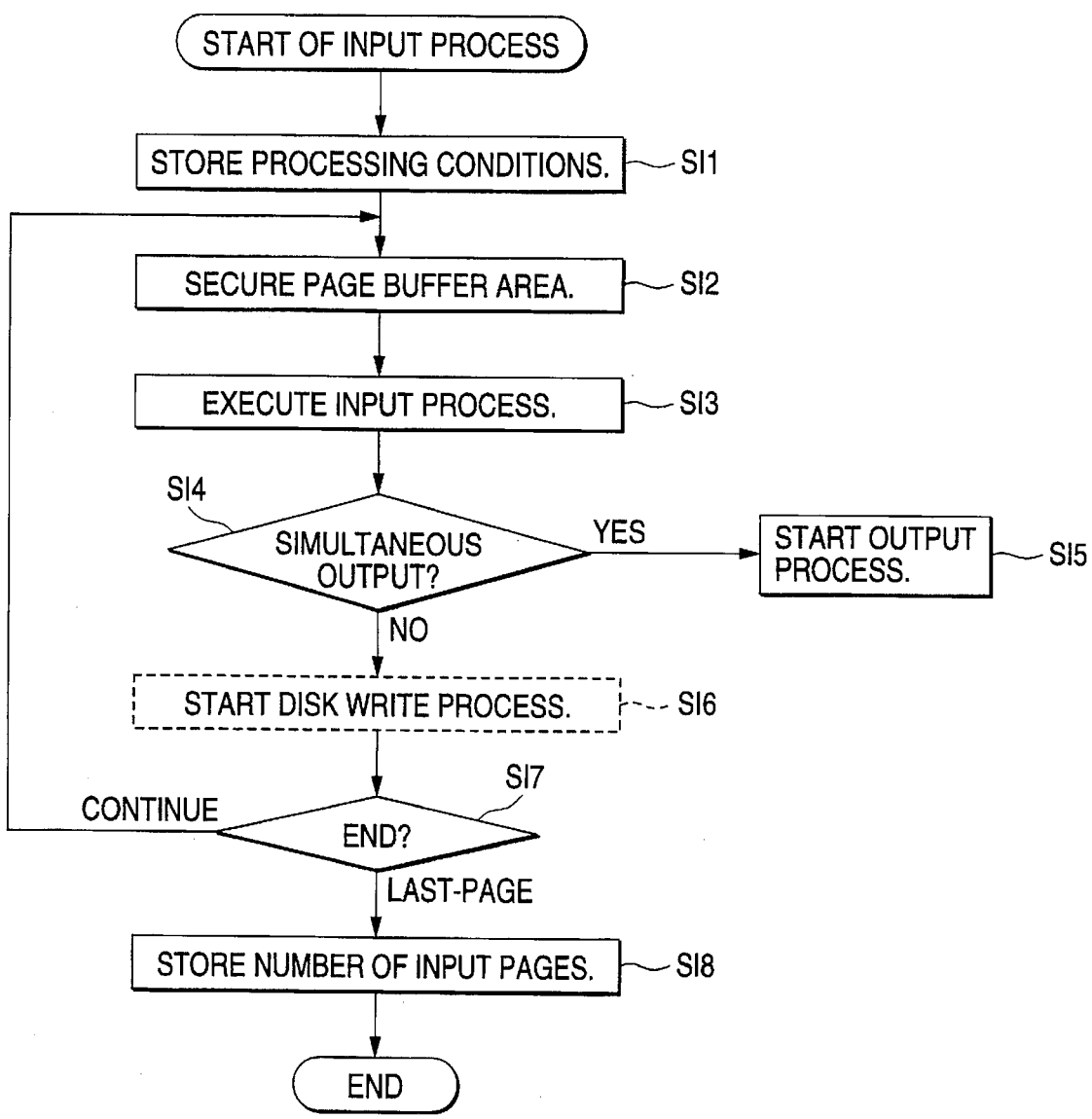
FIG. 22 is a flowchart to show input control module processing in the third embodiment.

FIG. 22 is a flowchart to show input control module processing. The image input process is executed as follows: First, when the operator enters a job request instruction through the operation and display section 53, the control section 52 fetches and stores setup processing conditions at step SI1 and assigns a job number to the job for new registration in the job management table JT. Next, the control section 52 reserves an area for writing image data onto the page buffer B6 at step SI2, drives the automatic document feed section M2 and the image read section M5 (image input unit) for starting image input, and stores digital image data output from the image input unit in the area reserved at step SI2 at step SI3. At this time, if output processing of another job is not performed at the image output unit and simultaneous output of the present job is enabled at step SI4, the control section 52 issues an output process drive request at step SI5. When image data is input and stored in the page buffer B6, writing the image data onto the hard disk B8 is started at step SI6 to save the image data if necessary. When the input process is repeated as many times as the number of original document sheets at step SI7, the control section 52 writes the determined number of input image sheets into the job management table JT at step SI8, and the image input processing is complete.

Figure 23:
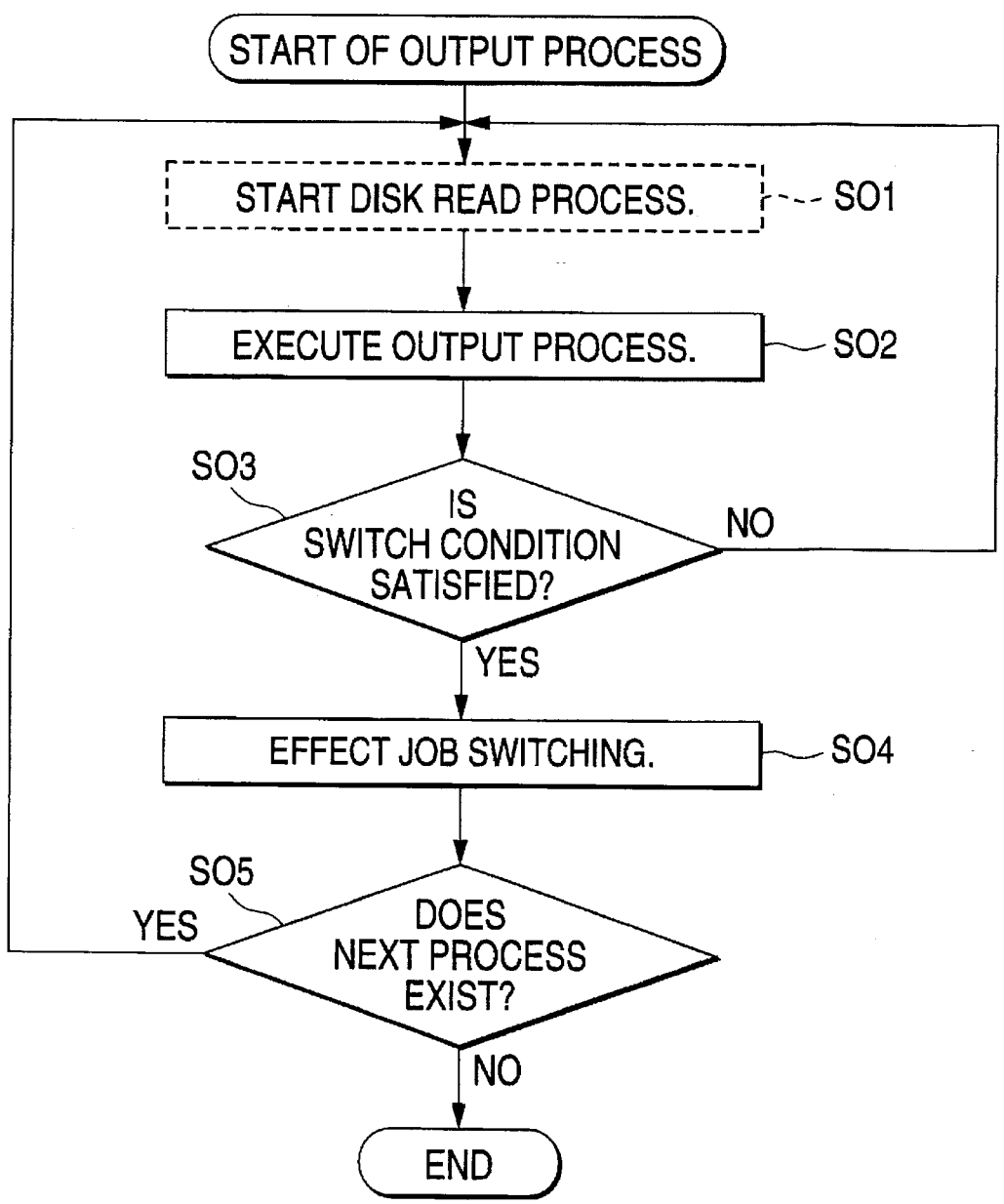
FIG. 23 is a flowchart to show output control module processing in the third embodiment.

As seen from the description given so far, the digital copier of the third embodiment can read original document sheets one after another, but only one image output unit (image formation section M1 and postprocessing section M3) is available and jobs form a queue for image output processing. The processing method at the image output unit is a method of processing the jobs in the order they enter the queue or a method of processing the jobs in parallel by switching the jobs on the queue in time sequence while processing the jobs in a predetermined amount unit at a time. The third embodiment adopts the latter method, which will be discussed below:

FIG. 23 is a flowchart to show output control module processing. The image output process is executed as follows: First, image data is read from the hard disk B8, is restored to the original image by the expander B9, and the image is expanded on the page buffer B6 at step SO1. The image data in the page buffer B6 is sent to the image formation section M1 and at the same time, an output processing instruction is given to the image formation section M1 and the postprocessing section M3 at step SO2. When output processing is started at the image output unit, processing measurement means (not shown) starts measuring the output processing amount. The means is made of a counter circuit that can be controlled by the MPU 101; to find the output processing amount, the counter circuit can count page end signals output from the image formation section M1. The number of output pages is used as the output processing amount unit; in addition, for example, the number of copies or the output processing time may be used as the unit. The output processing amount measured by the processing measurement means (not shown) is always monitored at step SO3. Output processing is consecutively executed until the output processing amount reaches a predetermined amount. When the output processing amount reaches a predetermined amount, the MPU 101 judges that the output processing switch condition is satisfied, and executes a job switch process at step SO4.

When the switch process is executed, the current job in output processing is stopped, the next job to be processed is selected, and output processing is started at step SO5. Steps SO1–SO5 are thus repeated until accepted jobs are complete, whereby the jobs can be processed consecutively and in parallel.

Next, FIGS. 24A–24C show examples of the job management table JT in the third embodiment. This job management table JT differs from that shown in FIG. 11 in the following two points: The first point is that the third embodiment, which provides the digital copier of a single function, does not manage the job mode. The second point is that the job processing state is managed in two types of state a focusing attention on processing at the image output unit and state b focusing attention on processing in job units. The state a takes any state of "processing," "wait for processing," or "stop." The state b takes any state of "processing," "unprocessed," or "stop." The state b has the same meaning as the state management item in the job management table JT shown in FIG. 11. However, since only one of jobs in simultaneous processing is actually processed at the image output unit, to discriminate the job being actually processed from other jobs in simultaneous processing, the job processing state is finely managed by using the state a and state b in combination.

Next, the job management table JT in the embodiment will be discussed. First, FIG. 24A is the job management table applied when the job with job number 1 is processed. Although output processing is performed in the job acceptance order, the embodiment assumes that the number of jobs that can be simultaneously processed is three, and the jobs with job numbers 1–3 are simultaneously processed. Thus, the state b of each of the jobs is "processing." However, at this time, only the job with job number 1 is actually processed at the image output unit, thus only the state a of the job with job number 1 is set to "processing" and the state a of the jobs with job numbers 2 and 3 is set to "stop." Since jobs with job number 4 and later are not processed, their state a is set to "wait for processing" and their state b is set to "unprocessed." At the termination of processing a predetermined amount of the job with job number 1, the state a of the job is set to "stop" and the state a of the job with job number 2 is changed to "processing" for restarting processing of the job with job number 2.

FIG. 24B is the job management table applied when the job with job number 2 is processed. Here, for the job, output of up to page 10 is complete in the previous processing and the present output is restarted at page 11. If jobs are switched every 10 pages, all processing of the job with job number 2 will be complete after the present processing. Upon completion of processing the job with job number 2, the information concerning the job is deleted from the job management table JT.

FIG. 24C is the job management table applied when the job with job number 3 is processed. The job with job number 3 is also restarted at output of page 11 (in fact, output of page 5 of the second copy). All processing of the job with job number 3 will also be complete after the present processing. Resultantly, the jobs with job numbers 4 and 5 are newly added as jobs that can be processed simultaneously with the job with job number 1 and after completion of the job with job number 3, output processing of the job with job number 4 is started.

In the description, the jobs are executed in the order they are accepted; however, after jobs are accepted, the job processing order may be changed in accordance with output order specification information as in the first embodiment.

Next, a selection method of a desired job in the third embodiment will be discussed.

Figure 25:
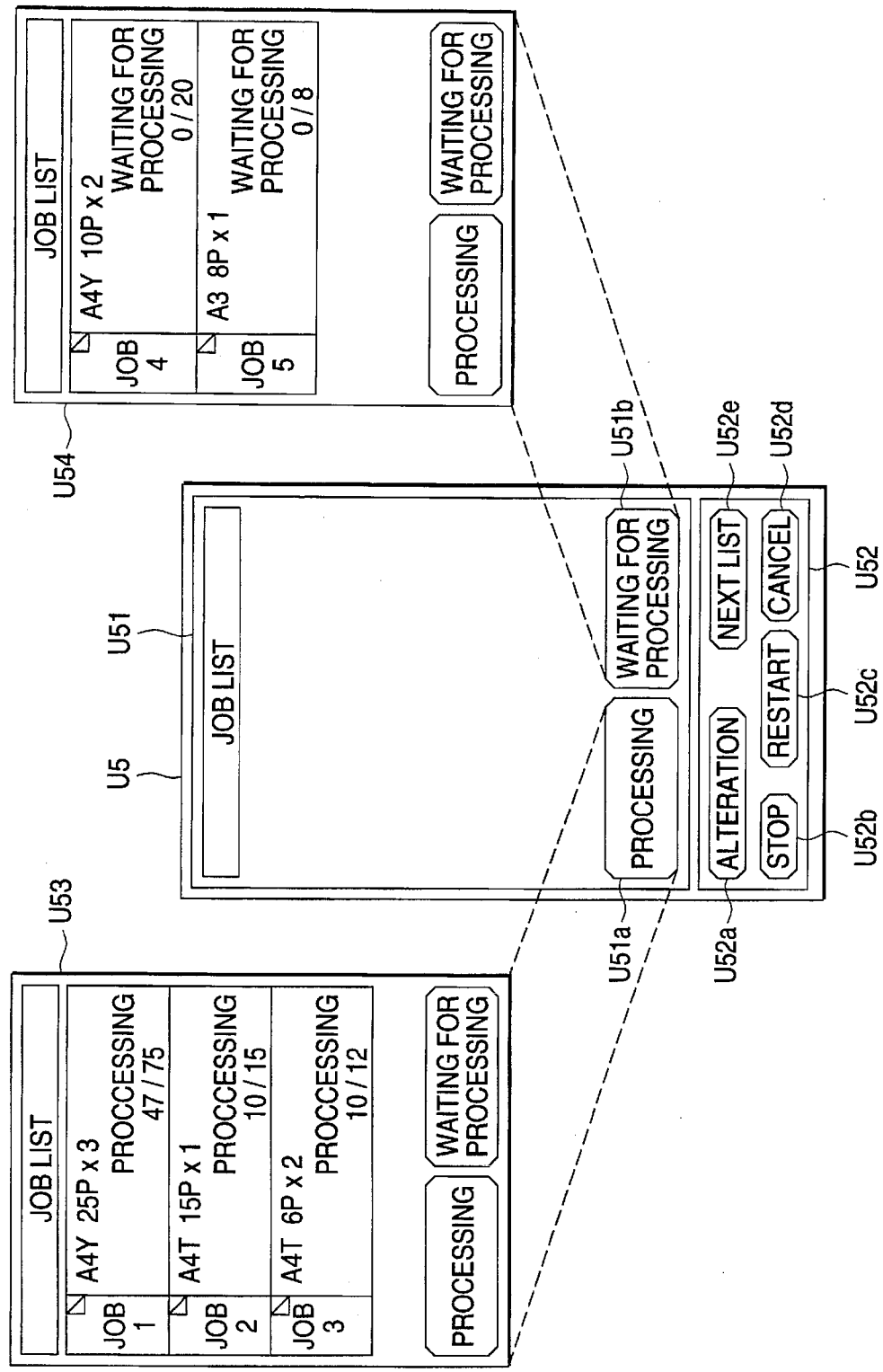
FIG. 25 is an illustration to show a control panel section contained in an operation and display section in the third embodiment.

FIG. 25 is an illustration to show a control panel section U5 contained in the operation and display section 53 shown in FIG. 19. The control panel section U5 has a job operation section U52 for the operator to specify alteration, stop, cancel, etc., of processing for a selected job. A job listing section U51 has a PROCESSING display key U51a selected for displaying a list concerning the job in processing and a WAIT FOR PROCESSING display key U51b selected for displaying a job list in the processing wait state.

The job operation section U52 has menu selection keys of an ALTERATION key U52a, a STOP key U52b, a RESTART key U52c, a CANCEL key U52d, and a NEXT LIST key U52e as with the first embodiment (see FIG. 7) and the second embodiment (see FIG. 14). The operation for checking and altering the job content with these keys is the same as that in the first and second embodiments and therefore will not be discussed again.

When the operator selects the PROCESSING display key U51a (reverse-displayed in FIG. 25), the control section 51 selects management information of the jobs whose state b is "processing" from the job management table JT shown in FIGS. 24A–24C, and displays the jobs on a job listing section U53. For the image forming apparatus that can perform simultaneous processing, the jobs thus displayed equal in processing order and are displayed in the job number order as in FIG. 25. The indication like "47/75" on the job listing section U53 means that the number of processed pages is 47 for the total output processing amount, 75 pages.

When the operator selects the WAIT FOR PROCESSING display key U51b, the control section 51 selects management information of the jobs whose state b is not "processing" from the job management table JT, and displays the jobs on a job listing section U54. At this time, preferably the jobs are displayed in relation to the execution order. In FIG. 25, the jobs, which are processed in the job acceptance order, are displayed in the job number order.

C-3. Modification of Third Embodiment (1) By the way, to identify jobs in the copy function of a digital copier or a composite machine, it is practical to focus attention on the number of original document sheets and the number of output copies to classify and display the jobs. Basically the number of output copies is entered by the operator through the operation and display section 53 and therefore is comparatively easily used as a job identifier. On the other hand, the number of original document sheets is often unknown and need not be known and therefore may be improper as a job identifier, but becomes an efficient identifier if it is already known. On the other hand, the total number of output sheets for one job cannot be specified if the number of original document sheets is unknown although the number of output copies is already known. Even if both are already known, the operator must previously find the total number of output sheets by calculation; it is not a very efficient identifier.

Figure 26:
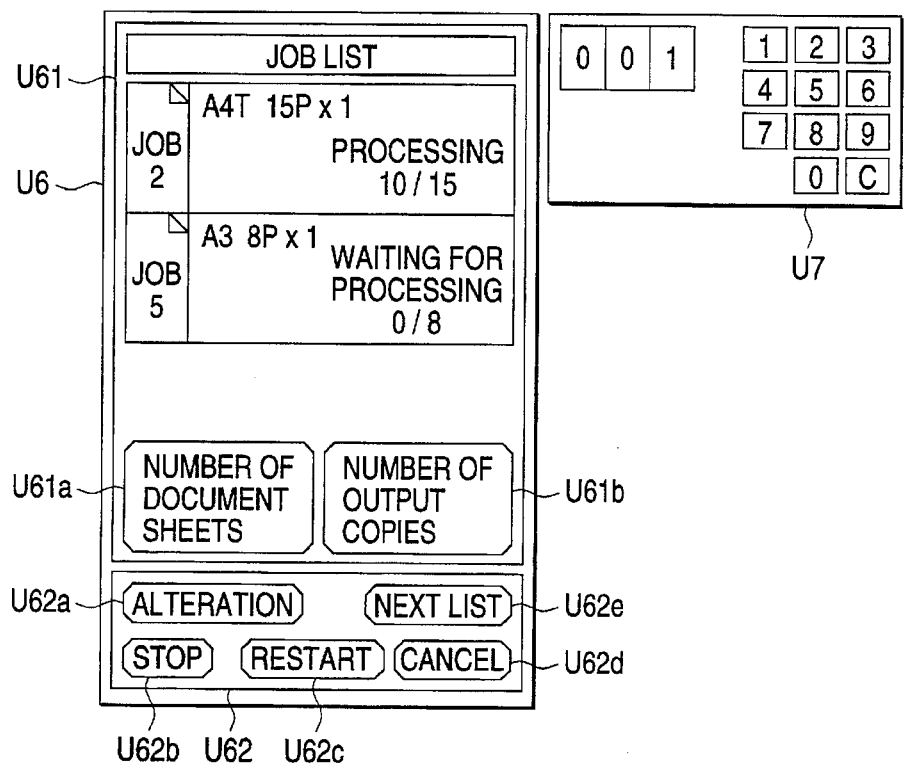
FIG. 26 is an illustration to show a control panel section which enables the operator to enter the number of original document sheets or the number of output copies for identifying a desired job from among jobs.

Next, FIG. 26 is an illustration to show a control panel section U6 which enables the operator to enter the number of original document sheets or the number of output copies for specifying a desired job from among jobs.

(2) On the control panel section U6 shown in FIG. 26, the operator enters the number of original document sheets or the number of output copies to be specified through a ten-key pad U7, then selects a NO. OF DOCUMENT SHEETS selection key U61a or a NO. OF OUTPUT COPIES selection key U61b, whereby a job matching the specified number of original document sheets or the specified number of output copies can be read from the job management table JT and be displayed on a job listing section U61. In the example in FIG. 26, jobs with the number of output copies 1 are selected from the job management table JT shown in FIG. 24A and are displayed. To focus attention on the number of original document sheets or the number of output copies for specifying a desired job from among jobs, the operator may also specify a job by entering the range of the number of original document sheets or the number of output copies of the desired job, such as "five or less," "6–10," or "11–20."

By the way, the jobs are classified in accordance with functions that can be executed at a composite machine for display on the job listing sections shown in FIGS. 14 and 16. The jobs are classified by focusing attention on the processing state in the system for display on the job listing sections shown in FIG. 25. The jobs are classified by focusing attention on the number of original document sheets or the number of output copies for display on the job listing sections shown in FIG. 26. Information on which attention is focused to classify jobs can be thought of as function identifiers for clarifying the processing function of each job. In other words, the job management table is read by using a function identifier fetched before job listing as a filter condition and jobs having the same identifier are collected, whereby a job list according to the invention is prepared. That is, the job management table JT is created containing function identifiers.

For example, in the block diagram of the control section 53 shown in FIG. 20 in the third embodiment, the job management table JT is formed in the RAM 102, a working memory of the MPU 101. Considering that the storage space of the RAM 102 is divided, the RAM 102 comprises a function identifier memory for storing the function identifiers.

(3) If the postprocessing section M3 in FIG. 18 has a plurality of sorter bins M35 in the image forming apparatus that can process jobs consecutively and simultaneously as in the third embodiment, outputs of jobs can be assorted for each sorter bin and the jobs can be prevented from being mixed.

How to assort job outputs at sorter bins may be previously specified by the operator or automatically determined by the image forming apparatus; in any way, information concerning printout trays like the sorter bins is extremely effective information for the operator to specify jobs. Therefore, the object of the invention can also be accomplished by using the printout tray information as identifiers for identifying jobs on the job listing sections shown in FIGS. 25 and 26. In this case, management information in the job management table JT contains the printout tray information, needless to say.

(4) In the image forming apparatus intended for improvement in productivity by processing jobs in parallel as in the third embodiment, productivity should be prevented from lowering even in processing change of any job. On the flow related to job processing change discussed with reference to FIG. 12, when the processing conditions of a selected job are changed, first the processing state of the job is set to the "stop state," thereby lessening the job amount of the job processed under the old setup conditions as much as possible. This method is not necessarily the optimum method if attention is focused on productivity. For example, to increase the number of copies of the job being processed over the previously setup number, productivity does not lower by continuing processing of the job also during the changing work rather than stopping processing of the job for changing the processing conditions. This means that the processing conditions may be changed while processing is continued or that processing may be stopped before the processing conditions are changed.

Figure 27:
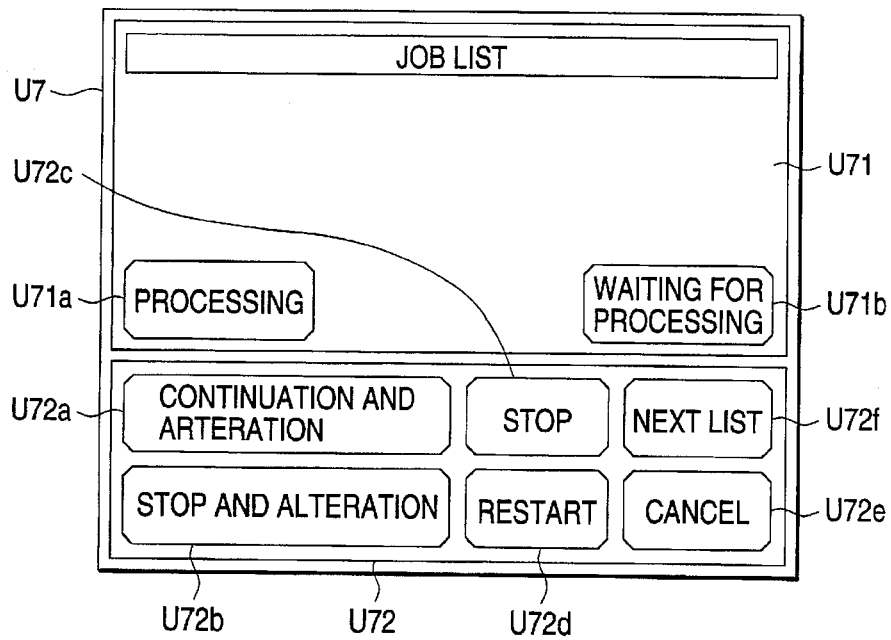
FIG. 27 is an illustration to show a control panel section with two types of ALTERATION keys.

Then, considering this point, a control panel section U7 with two types of ALTERATION keys is shown in FIG. 27. Like the control panel section U5 in FIG. 25, the control panel section U7 shown in FIG. 27 is made up of a job listing section U71 on which jobs are classified according to the processing state for display and a job operation section U72 for the operator to specify alteration, stop, cancel, etc. for a selected job.

The job listing section U71 has a PROCESSING display key U71a selected for displaying a list concerning the job in processing and a WAITING FOR PROCESSING display key U71b selected for displaying a list concerning jobs in the processing wait state. In place of the ALTERATION key on the job operation sections discussed above, the job operation section U72 has a CONTINUATION AND ALTERATION key U72a for changing the processing conditions while continuing processing and a STOP AND ALTERATION key U72b for stopping processing before changing the processing conditions like the ALTERATION key. Other menu selection keys, a STOP key U72c, a RESTART key U72d, a CANCEL key U72e, and a NEXT LIST key U72f have the same functions as those on the job operation sections discussed above.

Figure 28:
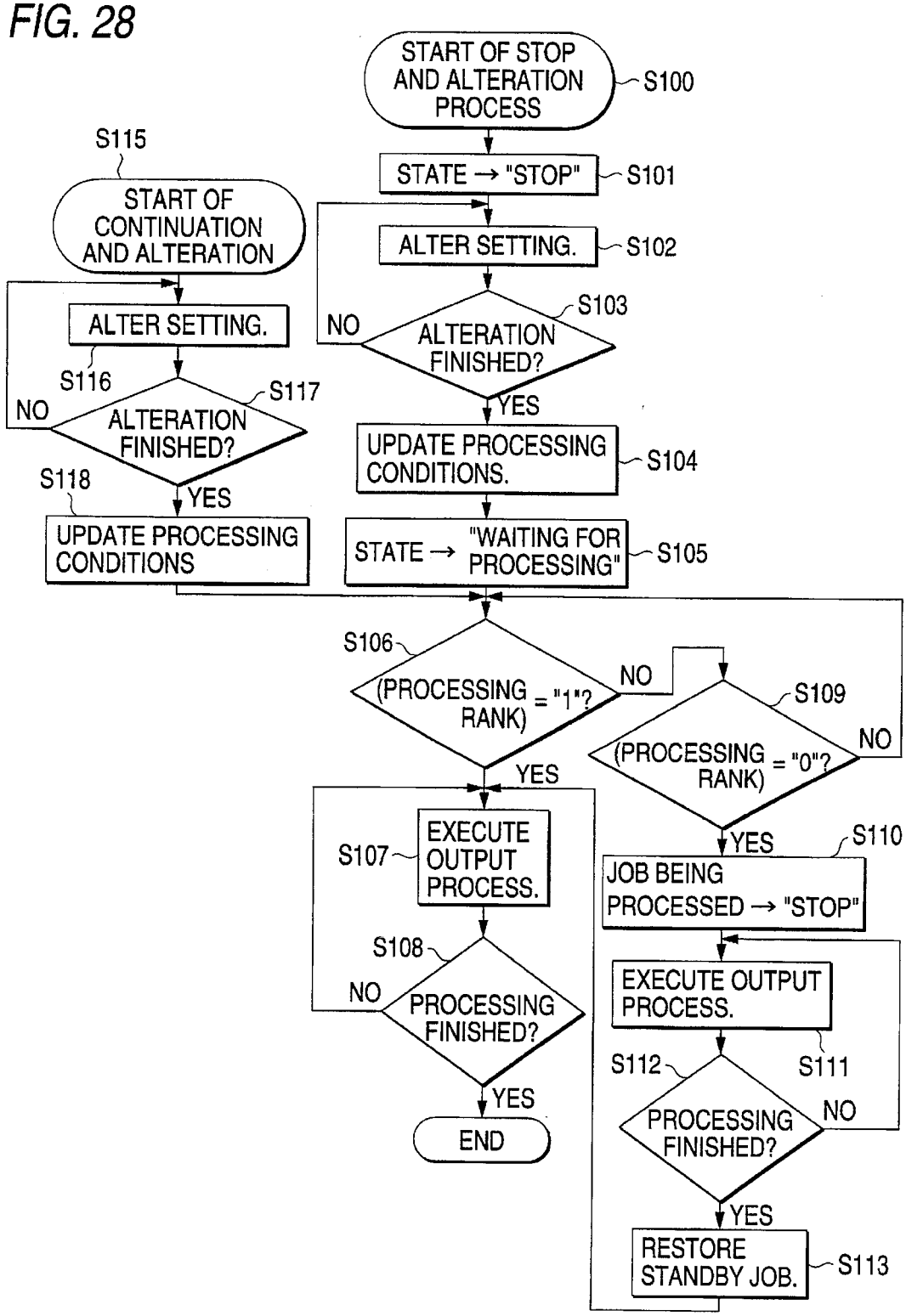
FIG. 28 is a flowchart to explain a continuation and alteration process and a stop and alteration process.

FIG. 28 is a flowchart to explain a continuation and alteration process and a stop and alteration process. First, when the operator selects the CONTINUATION AND ALTERATION key U72a on the job operation selection U72 in FIG. 27, the continuation and alteration process is started at step S115. In the continuation and alteration process, the processing state of the selected job is not altered at all. Therefore, the processing state of even the job being processed remains the "processing state." The operator makes necessary processing condition alteration for the job at step S116. At the termination of the alteration (when the operator selects something like the SETTING FINISHED key in FIG. 8) at step S117, the processing conditions are updated at step S118. The subsequent steps are the same as those in the stop and alteration process and therefore will be discussed later.

Next, when the operator selects the STOP AND ALTERATION key U72b on the job operation section U72 in FIG. 27, the stop and alteration process is started at step S100. In the stop and alteration process, the processing state of the selected job is set to the "stop state" at step S101. The operator makes necessary alterations to processing conditions for the job at step S102. At the termination of the alteration, the processing conditions are updated at step S104. Subsequently, the processing state of the job is restored to the "processing wait state" at step S105. The "processing wait state" continues until the processing rank is checked and the processing rank of the job becomes highest, and when the processing rank of the job becomes highest, the job is processed under the setup processing conditions at steps S106–S108.

If the continuation and alteration process is executed for the job being processed, the processing rank of the job is "1," thus immediately the job is processed under the updated processing conditions. On the other hand, if the stop and alteration process is executed, the processing rank of the job may become "0," indicating that the processing rank of the job becomes highest during the changing or that a job being executed is selected and alteration is performed for the job. At this time, immediately the job being processed is stopped and processing of that job takes precedence at step S110. After processing of the job terminates, processing of the interrupted job is continued at steps S111–S113.

By the way, the concept of changing the processing conditions without stopping processing of a selected job does not assume that a number of jobs can be processed consecutively and in parallel as in the third embodiment, and can also be applied to the system described in the first embodiment wherein job processing is switched in job units. Of course, the job processing function is not limited to a single function as in the third embodiment, and may be multiple functions as in the first embodiment.

Other Modifications (1) In the embodiments, the job processing state "PRINTING," "WAITING FOR PROCESSING," "PROCESSING," etc., is displayed for each job, whereby the jobs are classified according to the processing state. However, classification display is not limited to it. For example, color-code display may be produced. A frame responsive to the processing state is set and jobs corresponding to each frame (job information, job identifiers, etc.,) may be displayed, thereby classifying the jobs.

(2) In the first and second embodiments, the processing state such that the number of already processed pages is 47 for the total output processing amount, 75 pages like "47/75" is also displayed (see FIG. 25). This may also be displayed in an image such as a pie chart.

(3) The microcomputer in the control section 12, 52 detects each processing state. That is, the processing state of each job is grasped by a command generated from the microcomputer. In contrast, for example, a sensor for monitoring actual processing of IOT, etc., may be provided and the processing state may be grasped by output of the sensor.

(4) The job identifiers are not limited to those shown in the embodiment and may be any information if jobs can be identified.

(5) The job processing contents are changed by operation through the operation and display section 11, 53. In addition, for example, they may be changed by using data supplied from the outside via a network, etc. Particularly, to remotely operate a composite machine via a network, both jobs and control data, such as job content change data, are supplied from the outside.

As described above, according to the invention, the job information of jobs is displayed on the display means so as to be correlated with the execution order determined by the execution order determination means (for example, displayed in the ascending order), thus the operator can use the display means to check job information indicating the processing contents, etc., of the current job being executed or the job to be executed and further can use the job designating means to select any desired job.

Since the job information concerning the current job being executed is displayed on the display means, if the operator wants to stop or continue processing of a job, he or she can use the display means to check whether or not the current job being executed is the job. If the current job being executed is the job, immediately processing can be stopped or continued by the execution job processing determining means.

The job whose processing contents or conditions are to be altered can be found before or during execution of processing of the job and the processing contents or conditions can be altered through the processing alteration specifying means. Further, processing of other jobs is not hindered in the changing steps.

The job information of jobs stored in the job information storing means can be classified based on the process function information before display. Thus, a job whose processing function information is already known can be found and specified through the job designating means at an early stage.

The job information classified based on the process function information is displayed on the display means so as to be correlated with the processing order determined by the execution order determining means. Thus, a job whose processing function information is already known and whose execution order is high can be specified through the job designating means at an early stage before execution.

If the operator specifies the attribute of a processing function through the attribute designating means for specifying the processing function attribute, the display means displays the job information of jobs on a separate screen for each processing function so as to be correlated with the processing order of the jobs. Thus, the operator can check the job information for each function without enlarging the display means.

Since the job information concerning the current job being executed is classified based on the processing function information and displayed on the display means, if the operator wants to stop processing of a job, he or she can use the display means to check whether or not the current job being executed is the job. If the current job being executed is the job, immediately processing can be stopped or executed by the execution job processing determining means.

The job whose processing contents or conditions are to be changed can be found before or during execution of processing of the job based on the processing function information and the processing order and the processing contents or conditions can be changed through the processing alteration specifying means. Further, processing of other jobs is not hindered in the changing steps.

When the operator specifies any desired job from among jobs processed in a copier having original document information storing means for storing original document information requiring image formation by scanner means, he or she can use already known information such as the number of original document sheets or the number of copies to specify the job. Since the job information of jobs is displayed on the display means in the printout execution order based on the information of the number of original document sheets or the number of copies, the operator can find the job whose processing contents or conditions are to be changed before or during execution of processing of the job, and can change the processing contents or conditions through the processing alteration specifying means. Further, processing of other jobs is not hindered in the changing steps.

When the operator specifies any desired job from among jobs processed in an image forming apparatus that can perform simultaneous processing of multiple functions or a single function, the job information recognized by the job information recognizing means is displayed on the processing state correspondence display means based on the processing state of a plurality of jobs detected by the processing state detecting means. Thus, the operator can know what jobs are in processing at present or what jobs wait for processing, and further can select any desired job through the job designating means.

Whether processing of the job designated through the job designating means is to be stopped or continued is determined through the job processing determining means, and further a command for changing the processing contents is given through the processing alteration specifying means to the job whose processing stop or continuation is determined. Thus, to change the processing contents of even the job being processed, a change command can be given to the job without lowering the productivity of processing.

The function identifiers to clarify the processing functions of jobs requiring image formation are stored in the function identifier memory corresponding to the image data of the jobs stored in the image data memory. Thus, any desired job can be specified by specifying the function identifier indicating the processing function of the job. Particularly, the job information of the jobs having the specified function identifier can be classified by function and displayed on the display. Further, a specific job can be selected by the switch from among the jobs displayed on the display.

To select any desired job from among jobs processed in a printer being connected to a network, etc., for printing various pieces of information, the operator can use the already known type of page description language related to the job as the function identifier to display the jobs described in the page description language on the display from among the jobs.

To select any desired job from among jobs in simultaneous and consecutive print processing, the operator can look up the job identifiers displayed on the job identifier display means for reliably specifying the desired job through the job specification means.

Even if a number of jobs are executed for simultaneous and consecutive print processing, the operator can look up the job identifiers displayed on the job identifier display means, specify any desired job, and determine stop or continuation of processing of the job through the job processing determining means.

Since the printout tray information already known by the operator is used as the job identifiers, the operator can furthermore reliably select any desired job from among jobs in simultaneous and consecutive print processing.

What is claimed is:

1. An image forming apparatus for processing jobs requiring image formation, comprising:

means for inputting job information based on which each of the jobs can be identified;

means for determining an execution order of the jobs corresponding to the job information input through said job information inputting means;

means for storing the job information input through said job information inputting means;

means for displaying the job information stored in said job information storing means so that the job information is correlated with the execution order determined by said execution order determining means;

means for executing the jobs in the execution order determined by said execution order determination means while referencing the job information stored in said job information storing means; and means for designating a particular job from among the job information displayed by said display means, thereby allowing alteration of a processing content of the designated job.

2. The image forming apparatus as claimed in claim 1, further comprising means for determining whether a job being executed by said job executing means is to be stopped or continued.

3. The image forming apparatus as claimed in claim 1, further comprising means for specifying an alteration to a processing content of the job designated by said job designating means.

4. An image forming apparatus for processing jobs requiring image formation, comprising:
- means for inputting job information based on which each of the jobs can be identified, the job information including information indicating processing functions of the respective jobs;
- means for storing the job information input through said job information inputting means;
- means for displaying the job information stored in said job information storing means such that the job information is classified in accordance with the processing functions indicated by the job information;
- means for executing the jobs while referencing the job information stored in said job information storing means; and
- means for designating a particular job from the job information displayed by said display means, thereby allowing alteration of a processing content of the designated job.

5. The image forming apparatus as claimed in claim 4, further comprising means for determining an execution order of the jobs corresponding to the job information inputted through said job information inputting means, wherein said job executing means executes the jobs in the execution order determined by said execution order determining means, and said display means displays the job information so that the job information is correlated with the execution order determined by said execution order determining means.

6. The image forming apparatus as claimed in claim 4, further comprising means for designating an attribute of a processing function, wherein said display means displays the job information by using a screen dedicated to the attribute designated by said attribute designating means.

7. The image forming apparatus as claimed in claim 5, further comprising means for determining whether a job being executed by said job executing means is to be stopped or continued.

8. The image forming apparatus as claimed in claim 4, further comprising means for specifying an alteration to a processing content of the job designated by said job designating means.

9. An image forming apparatus comprising:
- scanner means for inputting document information;
- process information storing means for storing process information including at least one of information of the number of document sheets and information of the number of copies corresponding to the document information input by said scanner means;
- document information storing means for storing the document information input by said scanner means while referencing the process information stored in said process information storing means;
- display means for reading the process information corresponding to the document information stored in said document information storing means from said process information storing means, and for displaying at least one of the information of the number of document sheets and the information of the number of copies so that it is correlated with a print output execution order;
- means for selecting a particular process from the process information displayed by said display means, thereby allowing alteration of a processing content of the selected process; and
- means for altering the processing content of the selected process.

10. An image forming apparatus capable of parallel processing of jobs requiring image formation, comprising:
- means for recognizing, upon input of each of the jobs, job information based on which each of the jobs can be identified;
- means for detecting a job processing state in said image forming apparatus;
- processing state correspondence display means for displaying the job information recognized by said job information recognizing means such that the job information is classified in accordance with the processing states detected by said processing state detecting means; and
- means for designating a particular job from the job information displayed by said processing state correspondence display means, thereby allowing alteration of a processing content of the designated job.

11. The image forming apparatus as claimed in claim 10, further comprising:
- job processing determining means for determining whether execution of the job designated by said job designating means is to be stopped or continued; and
- means for specifying a alteration to the processing content of the job for which said job processing determining means has determined whether the execution is to be stopped or continued.

12. An image forming apparatus comprising:
- an image data memory for storing image data of jobs requiring image formation;
- a function identifier memory for storing function identifiers corresponding to the respective image data stored in said image data memory and indicating processing functions of the respective jobs;
- a display for displaying the jobs such that the jobs are classified in accordance with the function identifiers stored in said function identifier memory; and
- a switch for selecting a particular job from among the jobs displayed on said display.

13. The image forming apparatus as claimed in claim 12, wherein the function identifiers displayed on said display are page description language types.

14. An image forming apparatus comprising:
- means for inputting image data of jobs requiring image formation;
- recording means for printing the image data input through said image data input means on recording sheets, said recording means being capable of printing, in parallel, image data corresponding to a plurality of jobs input through said image data input means;
- job identifier display means for recognizing and displaying job identifiers for identifying the jobs to be processed in parallel by said recording means; and
- means for designating a particular job from the job identifiers displayed by said job identifier display means, thereby allowing alteration of a processing content of the designated job.

15. The image forming apparatus as claimed in claim 14, further comprising means for determining whether execution of the job designated by said job designating means is to be stopped or continued.

16. The image forming apparatus as claimed in claim 14, wherein the job identifiers displayed by said job identifier display means are print output tray information.

17. A job content altering method, comprising the steps of:

inputting job information based on which each of jobs requiring image formation can be identified;

determining an execution order of the jobs corresponding to the input job information;

means for storing the job information input through said job information inputting means;

displaying the job information in accordance with the determined execution order;

executing image formation of the jobs in the determined execution order; and making an instruction as to whether image formation of a job being executed is to be stopped or continued.

18. The job content altering method as claimed in claim 17, further comprising the steps of designating a particular job based on the job information being displayed, and altering a processing content of the designated job.

* * * * *